US010136486B2

(12) United States Patent
Segers et al.

(10) Patent No.: US 10,136,486 B2
(45) Date of Patent: Nov. 20, 2018

(54) LED LIGHTING SYSTEM

(71) Applicant: Silicon Hill B.V., Amsterdam (NL)

(72) Inventors: Maarten Willem Segers, Lochem (NL); Shounak Roy, Koog aan de Zaan (NL); Paul Steffens, Wermelskirchen (DE); Toon Groenendaal, Son (NL); Jurgen Honold, Amsterdam (NL)

(73) Assignee: SILICON HILL B.V., Amsterdam (NL)

( * ) Notice: Subject to any disclaimer, the term of this patent is extended or adjusted under 35 U.S.C. 154(b) by 0 days.

(21) Appl. No.: 15/715,288

(22) Filed: Sep. 26, 2017

(65) Prior Publication Data

US 2018/0020512 A1 Jan. 18, 2018

Related U.S. Application Data

(63) Continuation of application No. PCT/EP2016/056682, filed on Mar. 24, 2016.

(30) Foreign Application Priority Data

Mar. 26, 2015 (NL) ..................................... 2014525
Mar. 26, 2015 (NL) ..................................... 2014530

(51) Int. Cl.
*H05B 33/08* (2006.01)
*H05B 37/02* (2006.01)
(Continued)

(52) U.S. Cl.
CPC ....... *H05B 33/083* (2013.01); *H05B 33/0887* (2013.01); *F21K 9/27* (2016.08); *F21Y 2115/10* (2016.08); *H05B 33/0827* (2013.01)

(58) Field of Classification Search
CPC .. H05B 33/08; H05B 33/083; H05B 33/0809; H05B 33/0827; H05B 33/0887; H05B 37/02; F21Y 2115/10; F21K 9/27
(Continued)

(56) References Cited

U.S. PATENT DOCUMENTS 5,463,280 A 10/1995 Johnson
6,853,151 B2 2/2005 Leong et al.
(Continued)

FOREIGN PATENT DOCUMENTS

CA 2856753 A1 5/2012
CN 201571219 U 9/2010
(Continued)

OTHER PUBLICATIONS

Search Report for priority document NL2011495 dated May 7, 2014.
(Continued)

*Primary Examiner* — Jimmy Vu
(74) *Attorney, Agent, or Firm* — Hoyng Rokh Monegier LLP; David P. Owen

(57) ABSTRACT

An LED lamp arrangement adapted for fitting in a luminaire. The luminaire is adapted for a fluorescent lamp and having a ballast. The LED lamp arrangement has a plurality of LEDs, and two or more electrodes for releasably connecting to the luminaire and for conducting current from the ballast for supply to the LEDs. The LED lamp arrangement further has a sensor circuit and a protection circuit. The sensor circuit and the protection circuit are adapted to increase the total load impedance of the LED lamp arrangement if the ballast is a constant power electronic ballast.

15 Claims, 18 Drawing Sheets

(51) Int. Cl.
*F21Y 115/10* (2016.01)
*F21K 9/27* (2016.01)

(58) Field of Classification Search
USPC .......... 315/122, 150–158, 185 R, 209 R, 315/224–226, 291, 307, 308, 312
See application file for complete search history.

(56) References Cited

U.S. PATENT DOCUMENTS

| | | |
|---|---|---|
| 7,009,580 B2 | 3/2006 | Leung |
| 8,072,161 B2 | 12/2011 | Yang |
| 8,106,599 B2 | 1/2012 | Radermacher et al. |
| 8,384,311 B2 | 2/2013 | Gray et al. |
| 8,456,095 B2 | 6/2013 | Huynh |
| 8,471,495 B2 | 6/2013 | Muguruma et al. |
| 8,476,837 B2 | 7/2013 | Vos |
| 8,664,892 B2 * | 3/2014 | Radermacher ..... H05B 33/0806 315/224 |
| 8,760,064 B1 | 6/2014 | Yoon et al. |
| 8,766,550 B1 | 7/2014 | Yoon et al. |
| 8,816,591 B2 | 8/2014 | Chu et al. |
| 8,841,857 B2 | 9/2014 | Chu et al. |
| 8,896,227 B2 | 11/2014 | Moskowitz et al. |
| 8,952,617 B2 | 2/2015 | Hui et al. |
| 9,055,641 B2 | 6/2015 | Shteynberg et al. |
| 9,072,140 B2 | 6/2015 | Takahashi et al. |
| 9,101,012 B2 | 8/2015 | Yu et al. |
| 9,101,021 B2 | 8/2015 | Lys |
| 9,107,264 B2 | 8/2015 | Yu et al. |
| 9,113,525 B2 | 8/2015 | Leung et al. |
| 9,131,569 B2 | 9/2015 | Van De Ven et al. |
| 9,144,127 B1 | 9/2015 | Yu et al. |
| 9,161,404 B2 | 10/2015 | Wong et al. |
| 9,169,978 B1 * | 10/2015 | Chen .......................... F21K 9/17 |
| 9,185,759 B2 | 11/2015 | Nieberlein et al. |
| 9,210,757 B2 | 12/2015 | Tao et al. |
| 9,313,847 B2 | 4/2016 | Tao et al. |
| 9,441,795 B2 | 9/2016 | Segers et al. |
| 2006/0193131 A1 | 8/2006 | McGrath et al. |
| 2006/0221606 A1 | 10/2006 | Dowling |
| 2008/0231204 A1 | 9/2008 | Praiswater et al. |
| 2010/0091807 A1 | 4/2010 | Deppe et al. |
| 2010/0244696 A1 | 9/2010 | Kim |
| 2011/0057572 A1 | 3/2011 | Kit et al. |
| 2011/0127922 A1 | 6/2011 | Sauerlaender |
| 2011/0133658 A1 | 6/2011 | Sauerlaender et al. |
| 2011/0181194 A1 | 7/2011 | Hum et al. |
| 2012/0161666 A1 | 6/2012 | Antony et al. |
| 2012/0229040 A1 | 9/2012 | Brown et al. |
| 2012/0299490 A1 | 11/2012 | Lee et al. |
| 2012/0320627 A1 | 12/2012 | Araki et al. |
| 2013/0049618 A1 | 2/2013 | Radermacher |
| 2013/0127350 A1 | 5/2013 | Frias, Sr. |
| 2013/0147350 A1 | 6/2013 | Yang |
| 2013/0200812 A1 | 8/2013 | Radermacher et al. |
| 2013/0207561 A1 | 8/2013 | Yang |
| 2013/0241443 A1 | 9/2013 | Özgüc et al. |
| 2013/0320869 A1 | 12/2013 | Jans et al. |
| 2013/0342119 A1 | 12/2013 | Malboeuf Joset et al. |
| 2014/0021871 A1 | 1/2014 | Loef et al. |
| 2014/0084800 A1 | 3/2014 | Lee |
| 2014/0152184 A1 | 6/2014 | Tomiyama et al. |
| 2014/0159592 A1 | 6/2014 | Pan et al. |
| 2014/0192526 A1 | 7/2014 | Qiu |
| 2014/0203716 A1 | 7/2014 | Tao |
| 2014/0203717 A1 | 7/2014 | Zhang |
| 2014/0225519 A1 | 8/2014 | Yu et al. |
| 2014/0239834 A1 | 8/2014 | Choi et al. |
| 2014/0268778 A1 | 9/2014 | Van De Ven et al. |
| 2014/0362071 A1 | 12/2014 | Jung et al. |
| 2015/0042234 A1 | 2/2015 | Lee et al. |
| 2015/0048746 A1 | 2/2015 | Park et al. |
| 2015/0181659 A1 | 6/2015 | Kang et al. |
| 2015/0181661 A1 | 6/2015 | Hsia et al. |
| 2015/0198290 A1 | 7/2015 | Segers et al. |
| 2016/0183335 A1 | 6/2016 | Barth |

FOREIGN PATENT DOCUMENTS

| | | |
|---|---|---|
| CN | 101855943 A | 10/2010 |
| CN | 202261914 U | 5/2012 |
| CN | 102769975 A | 11/2012 |
| CN | 103687176 A | 3/2014 |
| EP | 1502483 B1 | 12/2008 |
| EP | 2381159 A2 | 10/2011 |
| EP | 2503235 A1 | 9/2012 |
| EP | 2602544 A1 | 6/2013 |
| EP | 2630842 A2 | 8/2013 |
| EP | 2793276 A1 | 10/2014 |
| EP | 2630843 B1 | 12/2014 |
| GB | 2447257 A | 9/2008 |
| GB | 2489513 A | 10/2012 |
| GB | 2495976 A | 5/2013 |
| GB | 2530766 A | 4/2016 |
| TW | 200838351 A | 9/2008 |
| TW | 201311032 A | 3/2013 |
| TW | M455820 U1 | 6/2013 |
| WO | 2011053708 A1 | 5/2011 |
| WO | 2012025626 A1 | 3/2012 |
| WO | 2012131573 A1 | 10/2012 |
| WO | 2012139691 A1 | 10/2012 |
| WO | 2012168828 A2 | 12/2012 |
| WO | 2014115010 A1 | 7/2014 |
| WO | 2015018735 A1 | 2/2015 |
| WO | 2015028526 A1 | 3/2015 |
| WO | 2015193071 A1 | 12/2015 |

OTHER PUBLICATIONS

International Search Report for PCT/EP2014/070568 dated Feb. 25, 2015.
International Preliminary Report on Patentability for PCT/EP2014/070568 dated Mar. 29, 2016.
Search Report for priority application NL2014525 dated Jan. 20, 2016.
International Search Report for PCT/EP2016/056641 dated Jul. 5, 2016.
International Preliminary Report on Patentability for PCT/EP2016/056641 dated Sep. 26, 2017.
Search Report for priority document NL2014530 dated Jan. 20, 2016.
International Search Report and Written Opinion for PCT/EP2016/056682 dated Jun. 29, 2016.
International Preliminary Report on Patentability for PCT/EP2016/056682 dated Sep. 26, 2017.
International Search Report and Written Opinion for PCT/EP2016/056683 dated Aug. 3, 2016.
International Preliminary Report on Patentability for PCT/EP2016/056683 dated Sep. 26, 2017.
Search Report for priority document EP16167599.6 dated Oct. 28, 2016.
International Search Report and Written Opinion for PCT/EP2017/059807 dated Aug. 21, 2017.

* cited by examiner

LED LIGHTING SYSTEM

CROSS REFERENCE TO RELATED APPLICATIONS

This application is a continuation of PCT application number PCT/EP2016/056682, filed on Mar. 24, 2016 which claims priority from Netherlands application number NL2014525, filed on Mar. 26, 2015, and Netherlands application number NL2014530, filed on Mar. 26, 2015. All of the above-mentioned applications are hereby incorporated by reference in their entireties.

BACKGROUND OF THE INVENTION

The invention relates generally to LED lamps and LED lighting, and more particularly to LED lamps suitable to replace a fluorescent lamp in a luminaire having a ballast for use with fluorescent lamps.

Fluorescent lighting has been around for many years now. This form of lighting started out as a highly efficient alternative for incandescent light bulbs, but has recently been surpassed by LED lighting to some extent in terms of efficiency and power consumption, and also in other aspects as set out below.

An LED (light emitting diode) is a semiconductor light source, e.g. with a PN-junction which emits light when activated. Typically, when a suitable voltage is applied, electrons are able to recombine with electron holes within the device, releasing energy in the form of photons. This effect is called electroluminescence, and the colour of the light (corresponding to the energy of the photon) is determined by the energy band gap of the semiconductor. LEDs for lighting purposes are often combined with one or more phosphors to broaden or change the emitted spectrum of the LED device.

Fluorescent lamps generally comprise a tube filled with an inert gas and a small amount of mercury, capped at both ends with double pinned end caps (thus four pins in total). To facilitate the starting conditions and to limit current through the fluorescent lamp during operation, an electrical ballast is connected between the mains power supply and the fluorescent lamp. When fluorescent lighting was first introduced, simple inductors for limiting AC current were used as ballasts, usually referred to as magnetic ballasts. More recently, luminaires for fluorescent lamps are usually provided with electronic ballasts.

Electronic ballasts comprise electronic elements which typically first convert AC mains voltage into a DC voltage, and subsequently convert the DC voltage into a high frequency AC voltage to drive the fluorescent lamp. Electronic ballasts typically control and maintain current actively through the fluorescent lamp as constant current sources.

LED lighting has many advantages. For example, no mercury is required for LED lighting, LED lighting is more directional, LEDs require less effort to control or regulate power consumed, and the lifetime is greatly increased over fluorescent lighting. More importantly, LED lighting saves more power than fluorescent lighting.

It is thus desirable to replace fluorescent lamps by LED lamps. However, an LED lamp typically operates differently when used with different ballasts. In some cases, a straightforward replacement of a fluorescent lamp by an LED lamp results in a failure of the entire luminaire.

Currently, there are LED lamps on the market shaped like fluorescent tubes that can be placed in an existing fluorescent luminaire. However, these LED lamps require the luminaire to be stripped of the ballast and re-wired to directly connect the LED lamp to a mains power supply without intervention of a ballast, or replaced by a ballast designed for LED lamps. The labour required for stripping and re-wiring the luminaire negates much, if not all, of the savings involved in switching to LED lighting, or even presents higher costs.

Since the knowledge of ballasts is beyond the knowledge of an ordinary consumer, there is a need for an LED lamp that is compatible with any existing luminaire designed for a fluorescent lamp, so that the LED lamp can be put into operation when mounted in such a luminaire without needing to determine the type of the ballast in the luminaire.

The inventors found, surprisingly, that a compatibility issue even exists among electronic ballasts, in particular when the LED lamp requires less energy than the fluorescent tube it is designed to replace.

LED lamps typically consume about 30% less energy compared to fluorescent lamps which produce substantially the same amount of light. A recent trend is a move to more than 50% energy saving, e.g. an LED lamp that operates at lower than 29 W to replace a 58 W fluorescent tube.

However, the inventors observed that, once the LED tube is designed to operate at such a low power (e.g. designed to save 50% energy), some designs of electronic ballast behave anomalously. In some cases this results in the lifetime of the ballast being unacceptably reduced, e.g. to a few hundred minutes.

In this anomalous situation, when the LED lamp is installed in a luminaire having such a ballast, the current drawn from the ballast is considerably increased, which in turn results in an increase of temperature in elements in the ballast. Consequently, these ballast elements become too hot, such that the lifetime of the ballast is reduced e.g. due to thermal runaway in critical components in the ballast) and possibly causing safety issues.

The inventors observed that ballasts having this anomalous behaviour are designed to operate as constant power sources, rather than constant current sources.

FIG. 1 shows a fluorescent lamp 101 arranged in a luminaire having a constant power ballast.

The luminaire is connected to an AC voltage source 102 (e.g. 230 V/50 Hz) and electronic components 103, which typically comprise a rectifier (which may be arranged in the ballast). The constant power ballast may comprise one or more inductors L1, L2, and one or more switches SW1, SW2 arranged to generate an output at a substantially constant power and at frequency in the range of e.g. 20 kHz-50 kHz.

A typical fluorescent lamp 101 has four electrodes (pins) for releasably connecting to the luminaire. Typically, the luminaire does not discriminate between different electrodes of the fluorescent lamp 101, so that the fluorescent lamp 101 does not have to be connected to the luminaire in a specific direction. After inserting the lamp in the luminaire, the two connections which supply the AC voltage from the ballast are called hot ends, and the other two connections (connected to capacitor 104) are called cold ends. In FIG. 1, the hot ends are labelled by letters A and D, and the cold ends are labelled by letters B and C.

A constant power ballast is designed to deliver a (nominally) constant amount of power to the lamp. The nominally constant amount of power may for example be derived from multiplication of the voltage drop across the lamp arrangement and the amount of current flowing through the lamp arrangement. When the fluorescent lamp is replaced by an LED lamp arrangement designed for operating at a lower power and the power consumed by the LED lamp arrangement is below the designed power of the ballast, these ballasts are designed to increase the current supplied to the LED lamp arrangement to reach the designed power. These ballasts are hereinafter called "constant power ballasts" for distinguishing from the majority of electronic ballasts, which are hereinafter called "constant current ballasts" as they are designed to maintain a substantially constant current output.

Constant power ballasts are typically designed to operate at a power that is significantly higher than the designed operation power of the energy saving LED lamp (e.g. designed to save 50% energy). Consequently, when fitting such an LED lamp in the luminaire, the constant power ballast determines that the power is too low (e.g. by determining that the voltage across the lamp is too low), so the ballast increases the current supplied to the LED lamp to reach the designed power output of the ballast. In the end, the current is too high and results in shortening the life or failure of the ballast.

BRIEF SUMMARY OF THE INVENTION

It is therefore an objective to provide an LED lamp arrangement which may be fitted in a luminaire adapted for a fluorescent lamp (e.g. a fluorescent tube), regardless of the type of the ballast in the luminaire, without requiring any modification of the luminaire. More particularly, it is an objective to provide such an LED lamp arrangement which solves the above-mentioned problem.

A first aspect of the invention concerns an LED lamp arrangement adapted for fitting in a luminaire, the luminaire adapted for a fluorescent tube and having a ballast.

The LED lamp arrangement according to the first aspect of the invention is at least suitable for use in the luminaire when the ballast is an electronic ballast, and is designed to adapt to a constant current ballast or a constant power ballast. In some embodiments, the LED lamp arrangement comprises a circuit for changing circuit configurations of LEDs in dependence on the ballast so that the LED lamp arrangement is suitable for fitting in a luminaire having a ballast, regardless whether the ballast is an electronic ballast or a magnetic ballast.

The LED lamp arrangement according to the first aspect of the invention comprises a plurality of LEDs, two or more electrodes for releasably connecting to the luminaire and for receiving a current from a ballast for supply to the plurality of LEDs in a first operation mode, and a sensor circuit adapted to measure one or more parameters elate to a amount of current received from the ballast in the first operation mode.

The LED lamp arrangement according to the first aspect of the invention is arranged to operate in a plurality of operation modes, wherein current from the ballast is conducted through the LEDs in each operation mode, i.e. so that the LED lamp arrangement produces light. The plurality of operation modes include the first operation mode and a second operation mode. The first operation mode and the second operation mode are designed for electronic ballasts. The plurality of operation modes may nevertheless comprise another operation mode designed for another type of ballast, such as a magnetic ballast.

The LED lamp arrangement according to the first aspect of the invention is adapted to automatically switch from the first operation mode to a second operation mode if the measured one or more parameters exceed a threshold which indicates whether the ballast is a constant current ballast or not a constant current ballast, for example an electronic ballast which is not a constant current ballast, such as a constant power ballast.

The LED lamp arrangement according to the first aspect of the invention is such that, in the first operation mode, the LED lamp arrangement has a lowest load impedance among the plurality of operation modes. In this way, the LED lamp arrangement can measure the one or more parameters in a lowest impedance mode, and can be arranged to remain in the lowest impedance mode if the ballast is a constant current ballast. The LED lamp arrangement then switches to a higher impedance mode if the measured one or more parameters exceed the threshold, indicating that the ballast is not a constant current ballast.

In this way, the LED lamp arrangement can operate in the lowest impedance mode when the ballast is a constant current ballast. Constant current ballasts typically comprise a self-protection/self-correcting mechanism to avoid potential problems of maintaining a constant current. The inventors observed that, if the LED lamp impedance deviates from the usual fluorescent tube impedance too much (e.g. having a large or different impedance), there is a risk that the LED lamp will be rejected by the ballast, i.e. the ballast will automatically shutdown or enter a safety mode. Thus, providing an LED lamp arrangement which measures the one or more parameters in the first (low impedance) operation mode can reduce such a risk. In an optional embodiment, the first operation mode defines a default mode when the LED lamp is switched on and the LED lamp arrangement detects that the ballast is an electronic ballast.

A second aspect of the invention concerns a method for operating an LED lamp arrangement in a plurality of operation modes. The LED lamp arrangement comprises a plurality of LEDs and is fitted in a luminaire, the luminaire being adapted for a fluorescent lamp and having a ballast.

The method according to the second aspect of the invention comprises: receiving a current from a ballast; conducting the current from the ballast through a plurality of LEDs in a first operation mode; measuring one or more parameters related to an amount of current from the ballast in the first operation mode; and automatically switching from the first operation mode to a second operation mode if the measured one or more parameters exceed a threshold which indicates whether the ballast is a constant current ballast or not a constant current ballast.

In the second aspect of the invention, in the first operation mode, the LED lamp arrangement has a lowest load impedance among the plurality of operation modes. This provides a similar advantage to the first aspect of the invention.

A third aspect of the invention concerns an LED lamp arrangement adapted for fitting in a luminaire, the luminaire adapted for a fluorescent lamp and having a ballast.

The LED lamp arrangement according to the third aspect of the invention comprises a plurality of LEDs, one or more rectifier circuits for rectifying the current and for supplying the rectified current to the LEDs, and a sensor circuit adapted to measure one or more parameters related to an amount of current drawn from the ballast by the LED lamp arrangement.

The LED lamp arrangement according to the third aspect of the invention further comprises more than two electrodes for releasably connecting to the luminaire and for receiving a current (which is not an ideal DC current) from the ballast. In an embodiment, the LED lamp arrangement has four electrodes. This allows the user to insert the LED lamp arrangement into the luminaire in any orientation, in the same way as a fluorescent lamp.

The LED lamp arrangement according to the third aspect of the invention further comprises a protection circuit connected to receive the rectified current and adapted to control an amount of current drawn from the ballast by the LED lamp arrangement. This arrangement of the protection circuit downstream of the rectifier in the DC current path is referred to as 'DC-chain' or 'behind the rectifier'. For example, the protection circuit may be arranged to connect to the luminaire via the one or more rectifier circuits.

The LED lamp arrangement according to the third aspect of the invention is arranged to operate in a plurality of operation modes including a first operation mode and a second operation mode, wherein the LED lamp arrangement has a different load impedance in the first operation mode than in the second operation mode, and wherein the protection circuit is arranged to automatically switch the LED lamp arrangement from the first operation mode to the second operation mode, if the measured one or more parameters exceed a threshold which indicates whether the ballast is a constant current electronic ballast or not a constant current electronic ballast.

This allows the user to connect the LED lamp arrangement to the luminaire just like a fluorescent lamp, so that the user does not have to worry about which orientation and/or direction will allow the protection circuit to function properly.

A fourth aspect of the invention concerns a method for operating an LED lamp arrangement in a plurality of operation modes, the LED lamp arrangement comprising a plurality of LEDs and being fitted in a luminaire, the luminaire being adapted for a fluorescent lamp and having a ballast, the method comprising: conducting a current from the ballast to the LED lamp arrangement; rectifying the current for supply to the plurality of LEDs; measuring one or more parameters related to an amount of current drawn from the ballast by the LED lamp arrangement; conducting the rectified current to the plurality of LEDs and a protection circuit; and increasing a load impedance of the LED lamp arrangement by means of the protecting circuit if the measured one or more parameters exceed a threshold which indicates whether the ballast is a constant current electronic ballast or not a constant current electronic ballast.

In this way, the fourth aspect of the invention provides a similar advantage to the third aspect of the invention.

A fifth aspect of the invention concerns an LED lamp arrangement adapted for fitting in a luminaire, the luminaire adapted for a fluorescent lamp and having a ballast, the LED lamp arrangement comprising: a plurality of LEDs; two or more electrodes for releasably connecting to the luminaire and for conducting current from the ballast for supply to the LEDs; and a protection circuit, arranged to conduct the current from the ballast in two operation modes consisting of a first operation mode and a second operation mode.

In the LED lamp arrangement of the fifth aspect of the invention, the protection circuit comprises: an impedance, arranged in series with the plurality of LEDs; and a fuse arranged across the impedance, for measuring one or more parameters related to the current from the ballast in the first operation mode, wherein the protection circuit is arranged to automatically switch from the first operation mode to the second operation mode, once the measured one or more parameters exceed a threshold which indicates whether the ballast is a constant current ballast or not a constant current ballast, and wherein, in the first operation mode, the impedance is shorted by the fuse, and in the second operation mode, the fuse is blown.

In this way, although the protection circuit only provides two operation modes (while the LED lamp arrangement may still have more than two operation modes for example by changing circuit configuration of LEDs), this is sufficient to solve the problem of constant power ballasts. The fifth aspect of the invention provides an advantage that fuses are cheap and can function as a sensor of a sensor circuit as well as a part of a protection circuit. In this way, the problem of constant power ballasts can be solved with a lower cost.

A sixth aspect of the invention concerns an LED lamp arrangement adapted for fitting in a luminaire, the luminaire adapted for a fluorescent lamp and having a ballast, the LED lamp arrangement comprising: a plurality of LEDs arranged in a plurality of groups, wherein the groups of LEDs are connectable in a plurality of circuit configurations, including at least a first circuit configuration and a second circuit configuration, wherein at least a portion of the groups of LEDs are connected to each other differently in different circuit configurations; a sensor circuit adapted to measure one or more parameters representing total current drawn from the ballast by the LED lamp arrangement; a protection circuit adapted to switch a connection of the plurality of groups of LEDs from the first circuit configuration to the second circuit configuration, once the measured one or more parameters exceed a threshold which indicates whether the ballast is a constant current ballast or not a constant current ballast, and wherein, in the first circuit configuration, the LED lamp arrangement has a lowest load impedance among the plurality of circuit configurations.

A seventh aspect of the invention concerns an LED lamp arrangement adapted for fitting in a luminaire, the luminaire adapted for a fluorescent lamp and having a ballast, the LED lamp arrangement comprising:
 a plurality of LEDs;
 two or more electrodes for releasably connecting to the luminaire and for conducting current from the ballast for supply to the LEDs:
 a sensor circuit adapted to measure one or more parameters representing total current drawn from the ballast by the LED lamp arrangement and/or representing voltage supplied by the ballast across the LED lamp arrangement; and
 a protection circuit electrically connected to at least one of the electrodes and adapted to control an amount of current drawn from the ballast by the LED lamp arrangement.

In an embodiment, the protection circuit is arranged to operate in a plurality of operation modes (in these operation modes an electrical current is conducted through the LED lamp arrangement to generate light), including a first operation mode and a second operation mode. The load impedance of the LED lamp arrangement (as viewed by the ballast) is different in the first operation mode than in the second operation mode.

In an embodiment, the protection circuit is arranged to automatically switch from the first operation mode to the second operation mode, once the measured one or more parameters exceed a threshold which indicates whether the ballast is a constant current electronic ballast or not a constant current electronic ballast, such as a constant power electronic ballast.

The protection circuit may be arranged to operate in a first operation mode in which the protection circuit has a first (effective) impedance, and in a second operation mode in which the protection circuit has a second different (effective) impedance, and is arranged to automatically switch from the first operation mode to the second operation mode on the basis of the measured one or more parameters (e.g. a measured current and/or a measured voltage).

The LED lamp arrangement (e.g. the protection circuit therein) is preferably adapted such that, during operation, a voltage drop across the LED lamp arrangement in the second operation mode is greater (e.g. having a larger absolute value of the voltage difference across the lamp) than the voltage drop across the LED lamp arrangement in the first operation mode. This may be achieved by increasing the impedance of the protection circuit or changing the circuit configuration of LEDs such that the total forward voltage of LEDs across the LED lamp arrangement is increased.

An eighth aspect of the invention concerns an LED lamp arrangement adapted for fitting in a luminaire, the luminaire adapted for a fluorescent lamp and having a ballast, the LED lamp arrangement comprising a plurality of LEDs, a sensor circuit and a second circuit.

In all aspects of the invention, the LED lamp arrangement can change the load impedance of the LED lamp arrangement in dependence on the current drawn from the ballast. This enables to increase the impedance seen by the ballast to result in a lower output current from the ballast, and solves the problem of risk of damage to the ballast if the luminaire contains a constant power ballast.

Each aspect of the invention may contain one or more features of another aspect of the invention. Moreover, the LED lamp arrangement according to any aspect of the invention may further comprise one or more of the following optional features.

In an embodiment, the LED lamp arrangement comprises a protection circuit electrically connected to at least one of the electrodes and adapted to control an amount of current drawn from the ballast by the LED lamp arrangement by switching from the first operation mode to the second operation mode.

In an embodiment, the protection circuit has a first impedance in the first operation mode, and has a second impedance in the second operation mode which is different from the first impedance. The LED lamp arrangement may comprise means for changing the operation mode of the LED lamp arrangement to increase the load impedance of the LED lamp arrangement.

The LED lamp arrangement may comprise means for changing a circuit configuration of the protection circuit, so that different components of the protection circuit are interconnected differently, so that the load impedance of the LED lamp arrangement is increased. In an embodiment, the sensor circuit comprises a fuse, and the protection circuit comprises an impedance and the fuse. The impedance is preferably arranged in series with the plurality of LEDs, and the fuse is arranged in parallel with the impedance. In this embodiment, the first operation mode corresponds to a first state of the protection circuit in which the impedance is shorted by the fuse, and the second operation mode corresponds to a second state of the protection circuit in which the fuse is blown.

The LED lamp arrangement may comprise means for rectifying a current received from the ballast, and means for supplying the rectified current to the impedance in the protection circuit. In an embodiment, the LED lamp arrangement comprises one or more AC to DC rectifier circuits arranged in series between the impedance and the ballast of the luminaire.

In an embodiment, the impedance has a total inductance value between 0.12 mH and 0.3 mH. It is observed by the inventors that the inductance in this range is particularly advantageous to allow the LED lamp arrangement to conduct a lower current from a constant power ballast, to result in a lower temperature in the components of the constant power ballast. In an embodiment, the LED lamp even comprises means for operating at a power of less than 75% of a designed power for the constant power ballast. In this way, the LED lamp arrangement not only can avoid the damage of components in the constant power ballast, but also can achieve a lower power consumption by the LED lamp arrangement.

In an embodiment, the impedance comprises a transformer having a first winding rid a second winding, wherein the first winding is arranged in series with the plurality of LEDs, and the second winding forms a closed loop with the fuse.

In an embodiment, the measured one or more parameters represent an amount of current received from the ballast by the LED lamp arrangement and/or an amount of voltage supplied by the ballast across the LED lamp arrangement.

In an embodiment, the plurality of LEDs are arranged in a plurality of groups, wherein the groups of LEDs are connectable in a plurality of circuit configurations including at least a first circuit configuration, and a second circuit configuration having a different circuit arrangement of the groups of LEDs in which at least a portion of the groups of LEDs are connected to each other differently than in the first circuit configuration, wherein the first circuit configuration corresponds to the first operation mode, and the second circuit configuration corresponds to the second operation mode, and wherein the LED lamp arrangement is adapted to automatically switch a connection of the plurality of groups of LEDs from the first circuit configuration to the second circuit configuration.

The LED lamp arrangement may comprise means for increasing total forward voltage of LEDs in the LED lamp arrangement. In an embodiment, the second circuit configuration comprises a greater number of LEDs connected in a series string than the first circuit configuration.

In an embodiment, the LED lamp arrangement is further arranged to automatically switch from the first operation mode or the second operation mode to a third operation mode, if the measured one or more parameters exceed a second threshold. Some examples are described below under FIGS. 11A-11D and FIG. 14.

The LED lamp arrangement may comprise means for detecting whether the ballast is a magnetic ballast, a constant current ballast, or another type of electronic ballast such as a constant power ballast. The LED lamp arrangement may further comprise means for switching to a third/fourth/another operation mode, if a magnetic ballast is detected. In an embodiment, the plurality of circuit configurations further comprise a third circuit configuration, wherein the LED lamp arrangement further comprises a circuit for generating an output indicating whether the ballast is a magnetic ballast or not a magnetic ballast, and a circuit for changing a connection of the plurality of groups of LEDs between the first circuit configuration and the third circuit configuration, or between the second circuit configuration and the third circuit configuration, on the basis of the output.

In an embodiment, switching from the first operation mode to the second operation mode reduces an amount of current drawn from the ballast by the LED lamp arrangement.

In an embodiment, switching from the first operation mode to a second operation mode comprises increasing an inductance of an impedance through which the current flows. Increasing the inductance of the impedance may comprise blowing a fuse connected in parallel to an inductive element, such as an inductor or a transformer.

In an embodiment, in the first operation mode the protection circuit has a first impedance, and in the second operation mode the protection circuit has a second impedance which is different from the first impedance.

In an embodiment, the sensor circuit is adapted to measure the one or more parameters from the rectified current received from the one or more rectifier circuits. Some examples are shown in FIGS. 4, 5, 8 and 12.

In an embodiment, the sensor circuit comprises a fuse, and the protection circuit comprises an impedance and the fuse, the impedance being arranged in series with the plurality of LEDs, and the fuse being arranged in parallel with the impedance, and wherein the first operation mode corresponds to a first state of the protection circuit in which the impedance is shorted by the fuse, and the second operation mode corresponds to a second state of the protection circuit in which the fuse is blown.

In an embodiment, the one or more rectifier circuits are arranged to output the rectified current having an AC part at a frequency higher than (e.g. approximately twice) the frequency of the current received from the ballast, and wherein the impedance has a total inductance value between 0.12 mH and 0.3 mH.

In an embodiment, the impedance comprises a transformer having a first winding and a second winding, wherein the first winding is arranged in series with the plurality of LEDs, and the second winding forms a closed loop with the fuse.

In an embodiment, the measured one or more parameters represent an amount of current received from the ballast by the LED lamp arrangement and/or an amount of voltage supplied by the ballast across the LED lamp arrangement.

In an embodiment, the plurality of LEDs are arranged in a plurality of groups, wherein the groups of LEDs are connectable in a plurality of circuit configurations including at least a first circuit configuration, and a second circuit configuration having a different circuit arrangement of the groups of LEDs in which at least a portion of the groups of LEDs are connected to each other differently than in the first circuit configuration, wherein the first circuit configuration corresponds to the first operation mode, and the second circuit configuration corresponds to the second operation mode, and wherein the LED lamp arrangement is adapted to automatically switch a connection of the plurality of groups of LEDs from the first circuit configuration to the second circuit configuration.

In an embodiment, the second circuit configuration comprises a greater number of LEDs connected in a series string than the first circuit configuration.

In an embodiment, the LED lamp arrangement is further arranged to automatically switch from the first operation mode or the second operation mode to a third operation mode, if the measured one or more parameters exceed a second threshold.

In an embodiment, the sensor circuit comprises a fuse, and the protection circuit comprises an impedance and the fuse, the impedance being arranged in series with the plurality of LEDs, and the fuse being arranged in parallel with the impedance, wherein the protection circuit is arranged to automatically switch to a third operation mode if the measured one or more parameters exceed a second threshold, and wherein: in the first operation mode, the impedance is shorted by the fuse, and the plurality of groups of LEDs are connected in the first circuit configuration; in the second operation mode, the impedance is shorted by the fuse, and the plurality of groups of LEDs are connected in the second circuit configuration; and in the third operation mode, the fuse is blown, and the plurality of groups of LEDs are connected in the first circuit configuration or the second circuit configuration.

In an embodiment, the plurality of LEDs are arranged in a plurality of groups, wherein the groups of LEDs are connectable in a plurality of circuit configurations, wherein at least a portion of the groups of LEDs are connected to each other differently in different circuit configurations, and wherein the LED lamp arrangement comprises a circuit for generating an output indicating whether the ballast is a magnetic ballast or not a magnetic ballast, and a circuit for changing a connection of the plurality of groups of LEDs between a circuit configuration to another circuit configuration on the basis of the output.

In an embodiment, increasing the load impedance comprises increasing an inductance through which the current flows. This may comprise blowing a fuse previously connected in parallel with an inductive element.

In an embodiment, the plurality of LEDs are arranged in a plurality of groups, wherein the groups of LEDs are connectable in a plurality of circuit configurations including at least a first circuit configuration, and a second circuit configuration having a different circuit arrangement of the groups of LEDs in which at least a portion of the groups of LEDs are connected to each other differently than in the first circuit configuration; and wherein increasing the load impedance comprises switching from the first circuit configuration to second circuit configuration.

In an embodiment, the plurality of LEDs is arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration.

In an embodiment, the sensor circuit is adapted to measure one or more parameters representing total current drawn from the ballast by the LED lamp arrangement and/or representing voltage supplied by the ballast across the LED lamp arrangement.

The second circuit is adapted to change a connection of the plurality of groups of LEDs between the first circuit configuration and the second circuit configuration, once the measured one or more parameters exceed a threshold which indicates whether the ballast is a constant current electronic ballast or a non-constant current electronic ballast.

In an embodiment, the second circuit configuration has a greater total forward voltage of LEDs across the LED lamp arrangement than the first circuit configuration. For example, the second circuit configuration may comprise a greater number of the LEDs connected in a series string than the first circuit configuration.

In an embodiment, the plurality of circuit configurations include three or more circuit configurations, wherein the second circuit is adapted to switch the circuit configuration of LEDs among the three or more circuit configurations, in dependence of a plurality of different threshold values which indicate different levels of total current drawn from the ballast.

In an embodiment, the LED lamp arrangement further comprises a plurality of switches. The plurality of switches are adapted to change the circuit configuration of LEDs among the first circuit configuration, the second circuit configuration, and a third circuit configuration having a different circuit arrangement of the groups of LEDs in which at least a portion of the groups of LEDs are connected into the circuit differently than in the first circuit configuration and in the second circuit configuration. The plurality of switches may be adapted to change the circuit configuration of the groups of LEDs among three or more different circuit configurations.

In one embodiment, the plurality of switches include a first set of switches, a second set of switches, and a third set of switches. These three sets of switches are adapted to change the plurality of groups of LEDs into three different circuit configurations. Other embodiments may extend this to include four or more sets of switches, and circuits adapted to change the groups of LEDs into four or more different circuit configurations.

In one embodiment, the plurality of groups of LEDs include a first group of LEDs, a second group of LEDs, a third group of LEDs, and a fourth group of LEDs. In the first circuit configuration, each of the first, second, third and fourth groups of LEDs are connected in parallel. In the second circuit configuration, the first group of LEDs and the second group of LEDs are connected in series in a first string, and the third group of LEDs and the fourth group of LEDs are connected in series in a second string, wherein the first string and the second string are connected in parallel. In the third circuit configuration, the first, second, third and fourth groups of LEDs are connected in series.

In one embodiment, the plurality of switches are further adapted to change the circuit configuration of LEDs to a from a fourth circuit configuration having a different circuit arrangement of the groups of LEDs in which at least a portion of the groups of LEDs are connected into the circuit differently than in the first, second and third circuit configurations.

The method according to any aspects of the invention may comprise: measuring one or more parameters representing total current drawn from the ballast by the LED lamp arrangement and/or representing voltage supplied by the ballast across the LED lamp arrangement; determining whether the ballast is a non-constant current electronic ballast, such as a constant power electronic ballast; and increasing the voltage across the LED lamp arrangement if the ballast is determined as a non-constant current electronic ballast.

In one embodiment, the method comprises:
receiving a current from the ballast
providing a variable impedance in series with the LEDs, the variable impedance and the LEDs being electrically connected to an output of the ballast; and
automatically increasing the impedance of the variable impedance if the current is above a predetermined threshold.

Another aspect of the invention concerns A method for manufacturing an LED lamp arrangement adapted for fitting in a luminaire, the luminaire adapted for a fluorescent lamp and having a ballast, the method comprising:
determining one or more threshold values of one or more parameters, the one or more threshold values indicating whether the ballast is a constant current electronic ballast or a non-constant current electronic ballast;
providing a plurality of LEDs in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration; and
providing a mechanism adapted to change a connection of the plurality of groups of LEDs between the first circuit configuration and the second circuit configuration, in dependence of the determined one or more threshold values.

The invention provides an advantage that the (effective) impedance (e.g. a load impedance as viewed by the ballast) of the lamp may be made changeable in dependence of the type of ballasts, which may be correlated with the measured one or more parameters.

By providing such a changeable (effective) impedance, the above-mentioned problem is solved.

The power dissipated by a conventional LED lamp is roughly proportional to the current drawn by the lamp, as the voltage across the lamp essentially corresponds to the forward voltage of the LEDs and does not involve much change. When the LED lamp is designed to operate a power that is about 50% of the designed power of a constant power ballast, it ends up with that the current is doubled by the ballast.

By contrast, where an effective impedance is provided, the nominal power estimated by the ballast is dependent from a square of the current (e.g. $P \approx I^2 \times Z + I \times Vf$). When the (effective) impedance is large enough, the increase of power is approximately dependent from the square-root of the current. This effectively reduces the current drawn from the constant power ballast.

However, although having such a high effective impedance solves the problem of constant power ballasts, it creates new problems for constant current ballasts. These ballasts show a high degree of non-compatibility with an LED lamp arrangement having a fixed high impedance and may react by rejecting the LED tube, as constant current ballasts typically have a self-correcting mechanism which rejects a load that does not look like a fluorescent lamp, e.g. the ballast will automatically shutdown or enter a safety mode.

Therefore, the objective of being compatible with a fluorescent lamp luminaire having any type of the ballasts is achieved by providing a protection circuit arranged to operate in a first operation mode in which the protection circuit has a first (effective) impedance, and in a second operation mode in which the protection circuit has a second different (effective) impedance, wherein the protection circuit is arranged to automatically switch from the first operation mode to the second operation mode on the basis of the measured one or more parameters.

The LED lamp arrangement may be a LED lamp or LED bulb, which is suitable for fitting in a luminaire that is adapted for a fluorescent tube (e.g. having a constant power ballast, constant current ballast, a magnetic ballast, etc). The LED lamp arrangement comprises two or more electrodes for releasably connecting to the luminaire. An example is pins on an LED tube for fitting in the luminaire, where the LED tube is not permanently mounted in the luminaire but can be removed by a user.

The sensor circuit may be adapted to measure a current representing total current drawn from the ballast by the LED lamp arrangement and/or a voltage representing voltage supplied by the ballast across the LED lamp arrangement. The measured voltage may be a voltage across a capacitive/resistive/inductive load in the LED arrangement, or may be voltage across the entire LED lamp arrangement. On the basis of the measured current and/or the measured voltage (including an estimated power on the basis of the measured current multiplied by the measured voltage), the protection circuit can switch from the first operation mode to the second operation mode. The operation modes may be discrete or continuous, e.g. having a variable impedance which can continuously change the effective impedance.

The LED lamp arrangement may comprise means for automatically increasing the impedance of the variable impedance if the current is above a predetermined threshold . The means for increasing the impedance of the variable impedance may comprise means for changing an electrical interconnection in the impedance. In an embodiment, the LED lamp arrangement is adapted to replace at least a fluorescent lamp in a luminaire having an electronic ballast, wherein the first impedance and the second impedance have a positive correlation with the measured current and/or the measured voltage, at a frequency larger than 5 kHz, e.g. there is a positive correlation when plotting the first and second impedances with corresponding measured current and/or the measured voltage.

As electronic ballasts typically operate at a frequency larger than 5 kHZ (e.g. 20-50 kHZ), the protection circuit may comprise a frequency dependent impedance for controlling an AC part of current drawn from the ballast. For example, the protection circuit may comprise an inductor. This frequency dependent impedance preferably has a positive correlation with the measured current/voltage. This makes it possible for the protection circuit to switch to a higher impedance mode when the sensor circuit determines a higher current/voltage, e.g. when a higher current is drawn from a constant power ballast.

The protection circuit can be adapted to control an amount of current drawn from the ballast by the LED lamp arrangement. In an embodiment, the protection circuit is arranged in series with the group of one or more LEDs. The LED lamp arrangement may comprise means for interrupting the current, such that, within 5 seconds after the current reaches a threshold value, the current is reduced to a value below the predetermined threshold.

In an embodiment, the sensor circuit is integrated with the protection circuit. The integrated protection circuit and the sensor circuit may comprise an inductor or a transformer, arranged in series with the group of one or more LEDs, and may comprise a fuse (as a sensor as well as a switch) arranged across the inductor or transformer (e.g. arranged in parallel with the inductor, or forming a closed loop with a first winding or a second winding of the transformer).

The LED lamp arrangement may comprise means for amplifying or deamplifying the current, and feeding the amplified or deamplified current to a sensor. In an embodiment, a first winding of the transformer is arranged in series with the group of one or more LEDs, and a second winding of the transformer forms a closed loop with the fuse. The second winding may comprise one or more turns adapted to blow the fuse at a pre-determined threshold value. This makes it possible to have a flexibility to choose a fuse of any available value and tune the blowing off current threshold as per requirement.

In an embodiment, the protection circuit is arranged to automatically switch from the first operation mode to the second operation mode on the basis of a threshold value of the measured current and/or the measured voltage. For example, the sensor circuit may comprise a fuse for changing a circuit configuration of the protection circuit (e.g. an electrical interconnection in the protection circuit) at a threshold (e.g. fuse rating/blow-off) value.

In an embodiment, in the first operation mode, the protection circuit and the sensor circuit form a closed loop; and in the second operation mode, the protection circuit and the sensor circuit form an open loop.

In an embodiment, the sensor circuit comprises a sensor for measuring the current and/or the voltage, wherein the sensor is also a switch in the protection circuit for shorting an impedance in the protection circuit, such that a ratio of the first impedance and the second impedance is less than 1/50 (e.g. the second impedance is 50 times or more times of the second impedance) at a frequency larger than 5 kHZ.

In an embodiment, the protection circuit is arranged to automatically switch to the second operation mode, when the ballast is a constant power ballast.

In an embodiment, the LED lamp arrangement is adapted to replace a fluorescent lamp in a luminaire having an electronic ballast or a magnetic ballast, wherein the plurality of LEDs are arranged to switch among at least a first circuit configuration and a second circuit configuration, in dependence of a frequency of an output of the luminaire. The first circuit configuration and the second circuit configuration may comprise different interconnections between the LEDs. For example, the LEDs may be arranged in a plurality of groups, wherein the groups of LEDs are connectable in a plurality of circuit configurations, including at least a first circuit configuration, and a second circuit configuration having a different circuit arrangement of the groups of LEDs in which at least a portion of the groups of LEDs are connected into the circuit differently than in the first circuit configuration, and wherein the LED lamp arrangement is configured to switch among at least the first circuit configuration and the second circuit configuration, in dependence of a frequency of an output of the luminaire. The frequency of the output of the (ballast in the) luminaire depends on whether the ballast is a magnetic ballast or an electronic ballast. Consequently, switching among the circuit configurations are such that the LED lamp arrangement is configured to switch among circuit configurations in dependence of a whether the ballast in the luminaire is a magnetic ballast or an electronic ballast. This dependency may be achieved by sensing a frequency of the output of the ballast, or sensing a frequency related parameter in current drawn from the ballast (e.g. a slope of the current) or voltage supplied by the ballast (e.g. slope), or by sensing any other one or more differences between an output of a magnetic ballast and an output of an electronic ballast.

In an embodiment, the protection circuit has an inductance value between 0.01 mH and 1.5 mH. When the LED lamp arrangement 1 (e.g. LED tube) is operated with a Magnetic ballast, the low frequency voltage/current (e.g. 100 Hz) supplied by the Magnetic ballast results in a low impedance of the inductance. In that case, the impedance of the protection circuit is low regardless in the first or second operation mode. This achieves an objective that the LED lamp arrangement operates at a high forward voltage with a low effective impedance, where the ballast is a magnetic ballast.

In an embodiment, the first circuit configuration comprises a greater number of the LEDs connected in a series string than the second circuit configuration.

In an embodiment, the group of LEDs comprises three or more strings of LEDs. For example, in the first circuit configuration, at least three of the three or more strings are arranged in series; and in the second circuit configuration, at least three of the three or more strings are arranged in parallel.

The LED lamp arrangement may comprise a housing accommodating the sensor circuit and the protection circuit. The housing preferably has a configuration suitable to replace a fluorescent lamp in a luminaire, i.e. tubular in shape and conforming generally to the shape of a conventional fluorescent tube.

BRIEF DESCRIPTION OF THE DRAWINGS

The following is a description of certain considerations, aspects and embodiments of the invention, referring to the appended drawings, in which the same or similar elements, components and aspects are designated with the same reference numbers, and which are only provided by way of example and should not be interpreted to limit embodiments under the present invention in any way. In the drawings.

DESCRIPTION OF ILLUSTRATIVE EMBODIMENTS

The following is a more detailed explanation of exemplary embodiments of the present invention.

Figure 2:
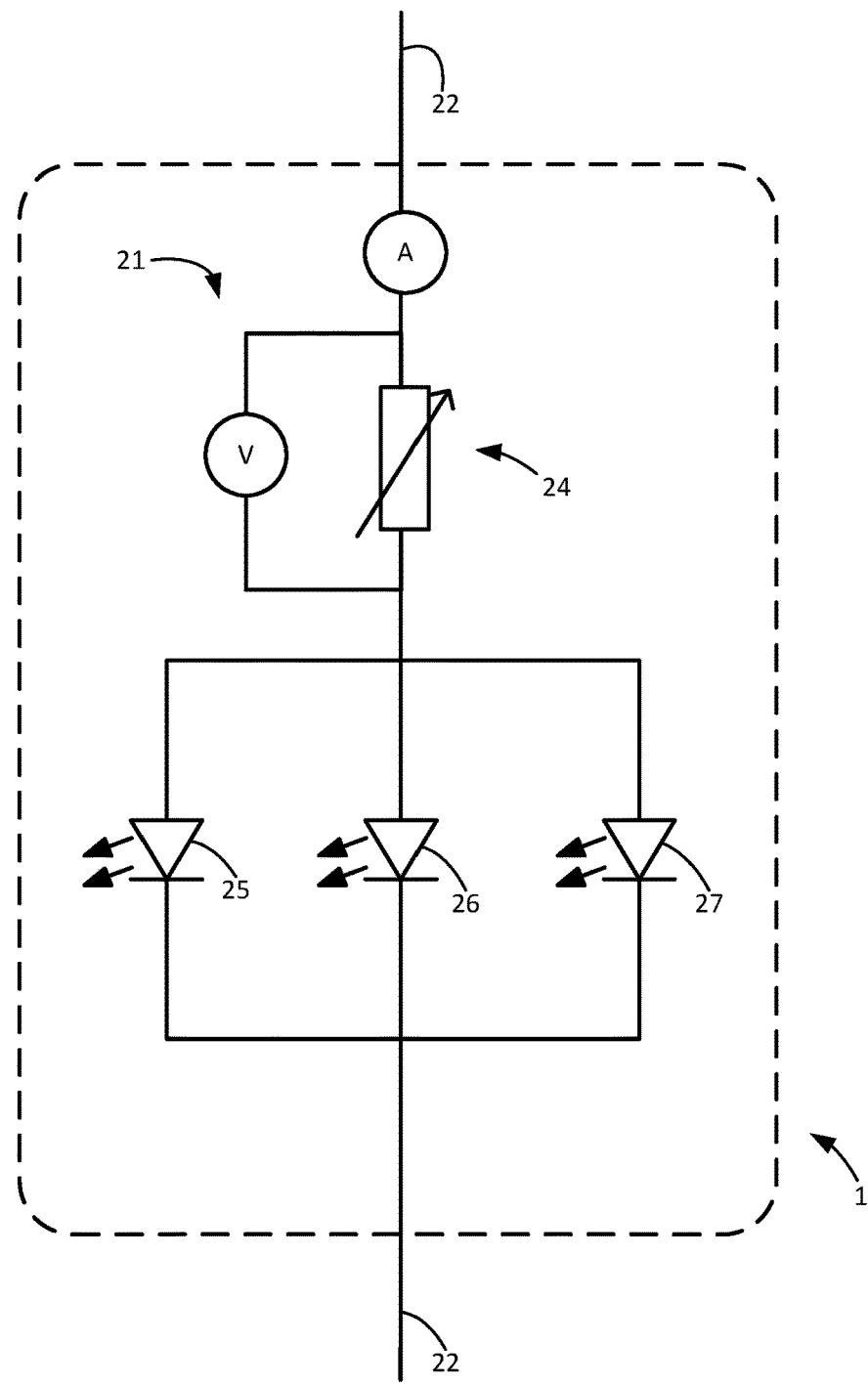
FIG. 2 shows an embodiment of the LED lamp arrangement 1 of the invention, comprising a circuit for operating in at least two operation modes having different values of effective impedances (e.g. a load impedance as viewed by the ballast).

FIG. 2 shows an embodiment of the LED lamp arrangement 1, comprising a group of one or more LEDs 25, 26, 27, electrodes 22 for releasably connecting to a luminaire and for conducting a current from a ballast for supply to the LEDs, a sensor circuit 21 for measuring a current representing a total current drawn from the ballast by the LED lamp arrangement 1 and/or a voltage representing a voltage supplied by the ballast across the LED lamp arrangement 1, and a protection circuit 24 provided with a variable impedance, arranged in series with the group of LEDs 25, 26, 27. In FIG. 2, the groups 25, 26 and 27 of LEDs represented as a single LED symbol for simplicity, but it should be understood that each group of LEDs may comprise one or more strings of LEDs. In this arrangement, current flowing from the ballast flows through the protection circuit 24 and the group of LEDs 25, 26, 27, and a change of impedance of the protection circuit 24 will affect the total impedance across the output of the ballast.

The protection circuit 24 can switch between at least two impedance values, so as to conduct current at least in a first (low impedance) operation mode and in a second (high impedance) operation mode and optionally further modes, e.g. in two or more discrete operation modes. Alternatively, the protection circuit 24 may comprise a variable impedance that can continuously change an effective impedance to conduct current at different impedance values.

The sensor circuit 21 is arranged to measure or react to a current and/or a voltage, wherein a change of the measured value(s) represents a change of the total current drawn from the ballast and/or the voltage across the LED lamp arrangement 1. The sensor circuit 21 may include a sensor, e.g. a voltage or current sensor, or may use an electrical element which has different characteristics at different current/voltage values, or an electrical element that reacts or "trips" when a certain current or voltage threshold is reached.

The sensor circuit 21 may be arranged to measure a current value that is representative of the total current drawn from the ballast. This is depicted schematically in FIG. 2 as a current sensor 21a arranged in series with the protection circuit 24 for measuring the total current drawn from the ballast. A current sensor may also be arranged in another way for measuring a current value that is representative of the total current drawn from the ballast. These embodiments will be explained below in more detail.

The sensor circuit 21 may be arranged to measure a voltage representing a voltage supplied by the ballast across the LED lamp arrangement 1. In the embodiment shown, a voltage across the protection circuit 24 is measured by voltage sensor 21b. This voltage represents the voltage across the entire LED lamp arrangement 1, which can be estimated by adding the measured voltage to an estimated forward voltage of the LEDs.

The sensor circuit 21 and protection circuit 24 may be arranged so that the protection circuit 24 automatically switches its operation mode in reaction to the sensor circuit 21, on the basis of the sensed current or voltage reaching or exceeding a predetermined threshold. When the current extracted from the ballast and/or the voltage supplied by the ballast increases above a threshold, the protection circuit 24 is arranged to automatically switch from the first operation mode to the second operation mode. As the impedance of the protection circuit 24 increases, the current drawn from ballast is reduced, and thermal runaway and other detrimental effects in the ballast can be avoided and the lifetime of the ballast can be increased.

In this way, a low power LED lamp arrangement can be safely fitted in a luminaire designed for a higher power fluorescent lamp (e.g. a 28 W LED lamp replacing a 58 W fluorescent tube), even when the luminaire is equipped with a constant power ballast. The constant power ballast will try to maintain its design output power (e.g. 58 W) by changing its output voltage, and driving higher output current. The sensor circuit 21 will react to the higher ballast output current and cause the protection circuit 24 to automatically switch to the second operation mode with a higher impedance. This increases the total impedance of the LED lamp arrangement, increases the voltage across the ballast output, and reduces ballast output current to avoid damage to the ballast.

In a preferred embodiment, the default mode is the first operation (low impedance) mode. The protection circuit 24 is arranged to switch from the first operation mode to the second operation mode only where the increase of the current extracted from the ballast and/or voltage supplied by the ballast reaches or exceeds a threshold value. This ensures that the LED lamp arrangement 1 operates in the first operation mode, e.g. when the ballast is a constant current ballast. Constant current ballasts typically comprise a self-protection/self-correcting mechanism to avoid potential problems of maintaining a constant current. The inventors observed that, if the LED lamp impedance deviates from the usual fluorescent tube impedance too much (e.g. having a large or different impedance), there is a risk that the LED lamp will be rejected by the ballast, i.e. the ballast will automatically shutdown or enter a safety mode. Thus, providing an LED lamp arrangement 1 which operates in the first operation mode by default can reduce such a risk.

In one embodiment, the sensor circuit 21 includes active sensing components, e.g. provided with one or more operational amplifiers, and/or one or more transistors, and/or one or more MOSFETs, and/or a microcontroller or microprocessor to monitor the current extracted from the ballast and/or the voltage supplied by the ballast.

In the embodiment shown in FIG. 2, the group LEDs comprises three or more strings of LEDs arranged in parallel. Preferably, the group of LEDs comprises 5 or more strings of LEDs, and each string preferably comprises less than 20 LEDs. Preferably, the strings of LEDs are arranged to automatically switch to a parallel circuit configuration when the ballast is an electronic ballast.

In one embodiment, the sensor circuit 21 and the protection circuit 24 are arranged in a single housing with the LEDs, as shown as dashed lines in FIG. 2. The housing preferably has a configuration suitable to replace a fluorescent lamp in a luminaire, i.e. tubular in shape and conforming generally to the shape of a conventional fluorescent tube.

The electrodes 22 may be pins for fitting the LED lamp arrangement in the luminaire and for conducting current. The pins are preferably located at one end of a housing accommodating the sensor circuit 21, protection circuit 24, and LEDs, and adapted for connection to a conventional fluorescent luminaire.

Figure 3:
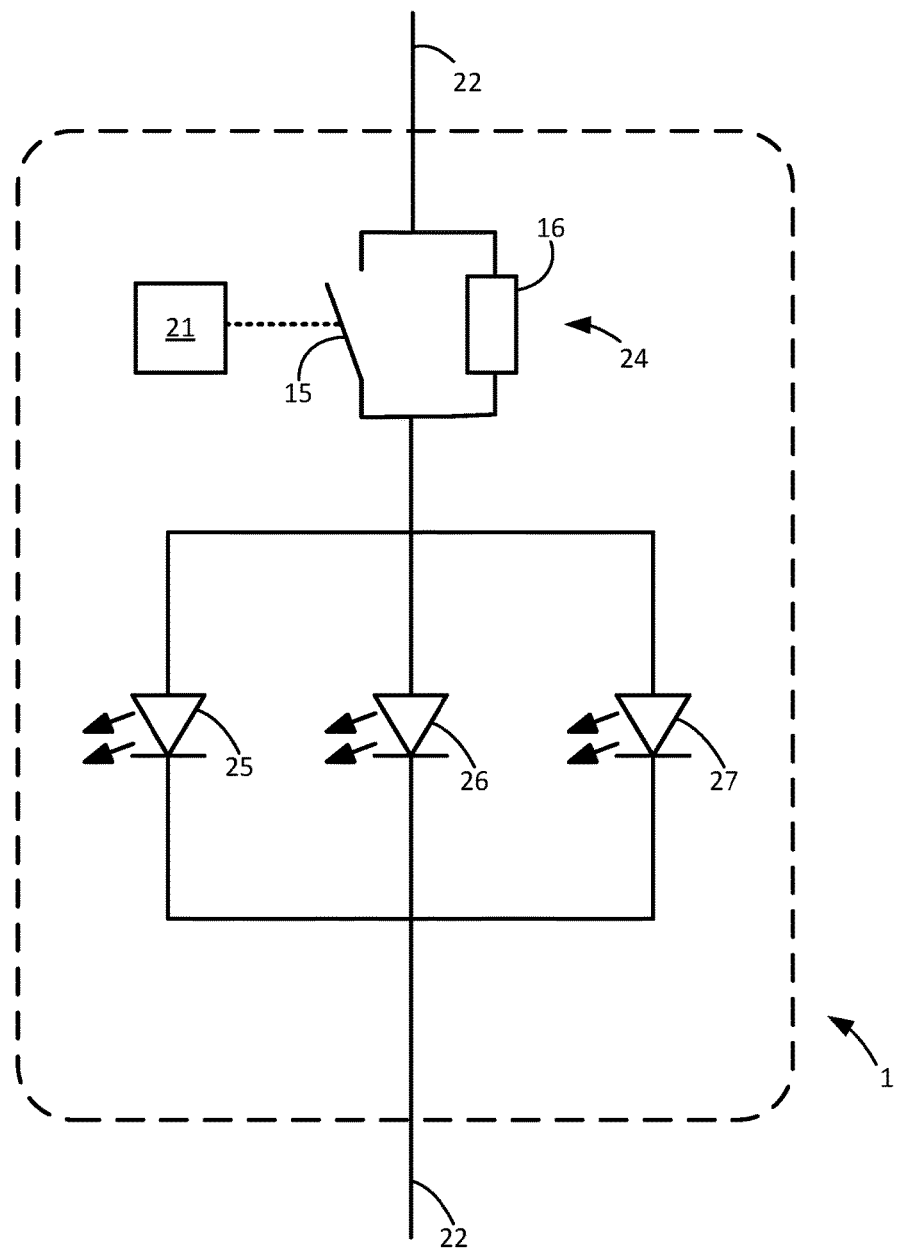
FIG. 3 shows an embodiment of the LED lamp arrangement 1 of the invention, comprising two discrete operation modes.

FIG. 3 shows an embodiment of the LED lamp arrangement 1 of the present invention, wherein the protection circuit 24 comprises an impedance 16 and a switch 15 arranged in parallel across the impedance 16. This embodiment may also comprise any elements described under FIG. 2. The sensor circuit 21 may be arranged in series or in parallel with the protection circuit 24, e.g. as shown in FIG. 2, or may comprise one or more elements which also form a part of the protection circuit.

In the embodiment shown in FIG. 3, the sensor circuit 21 is arranged to open or close the switch 15 on the basis of the current and/or voltage measured by the sensor circuit 21. For example, the protection circuit 24 may be arranged to switch from the first operation mode to the second operation mode by opening the switch 15. In the embodiment shown, in the first operation mode, the switch 15 is closed and the impedance 16 is shorted by the switch. The impedance of the switch 15 is preferably low, so that in the first operation mode the protection circuit 24 has negligible effect on the operation of the ballast and the LED lamp arrangement. In the second operation mode (as shown), the switch 15 is open, such that all of the current drawn from the ballast flows through the impedance 16. The impedance of the impedance 16 is considerably higher than that of the switch 15, so that the protection circuit 24 increases the overall impedance across the output of the ballast.

In one embodiment, the sensor circuit 21 is arranged to determine whether a current flowing through the switch and/or a voltage across the switch 15 is beyond a predetermined threshold value.

For example, when the current/voltage is below the threshold value, e.g. when a constant current ballast is connected to the LED lamp arrangement 1, the switch 15 remains closed, so that the effective impedance of the protection circuit 24 has an order of magnitude determined by the switch 15 (first operation mode).

When the current/voltage reaches the threshold value (e.g. when the ballast is a constant power ballast, which may generate 2 times the current from the ballast relative to a constant current ballast), the switch 15 is open, such that the effective impedance of the protection circuit 25 has an order of magnitude determined by the impedance 16. As a result, the protection circuit 24 switches from the first operation mode (lower impedance) to the second operation mode (higher impedance), reducing the current from the ballast to avoid the thermal runaway.

In the embodiment shown in FIG. 3, the sensor circuit 21 may be arranged to measure voltage across the impedance 16. The total voltage can be estimated by adding the voltage to an estimated forward voltage of the LED strings 25-27. Alternatively, the voltage may also be measured across the entire LED lamp arrangement 1, i.e. across the protection circuit 24 and the LEDs 25, 26, 27. The voltage may be measured before the LEDs conduct a current. For example, the sensor circuit 21 may comprise a load (e.g. a dummy impedance), which preferably has a substantially proportional characteristic of voltage change per change in current. The load may be arranged to temporarily conduct a current for a finite amount of time for determining a voltage across the LED lamp arrangement 1, so as to determine the type of the ballast.

The switch 15 may be any suitable type of switch, for example, an electromechanical switch such as a relay, a semiconductor switch such as a transistor, or any other electrical component that can break an electrical circuit such as a fuse, interrupting the current or diverting it from one conductor to another. The switch can also be designed for one-time use or may be resettable. A temperature-operated switch (e.g. a thermo-switch) may also be used.

In the embodiment shown in FIG. 3, the protection circuit 24 is arranged in series with all LEDs 25, 26, 27 in the LED lamp arrangement 1. As the LED lamp arrangement 1 only needs one protection circuit, the cost is low. In addition, since the current flowing through the protection circuit 24 in this case is maximum (e.g. a sum of all currents flowing though groups of LEDs arranged in parallel), the sensitivity of the sensor circuit 21 is increased which facilitates determination of the current flowing through the switch 15 and/or the voltage across the switch 15.

Alternatively, the LED lamp arrangement 1 may comprise a plurality of groups of LEDs with each group of LEDs arranged in series with a separate protection circuit. The protection circuit and the LEDs may also be integrated in one circuit.

Preferably, the protection circuit 24 is arranged to receive a rectified current from a rectifier. An example is shown in FIG. 4.

Figure 4:
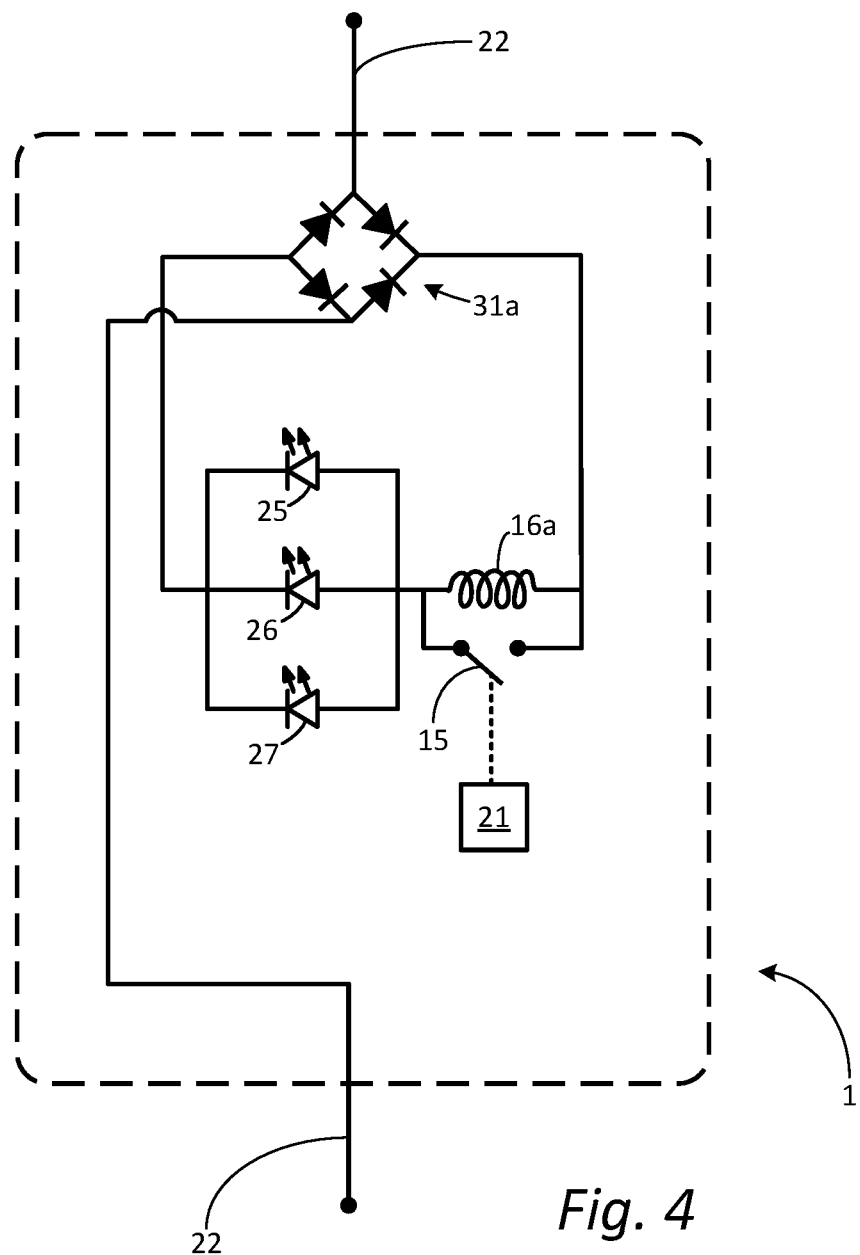
FIG. 4 shows an embodiment of the LED lamp arrangement 1 of the invention, comprising a protection circuit arranged to receive a rectified current.

FIG. 4 shows an embodiment of the LED lamp arrangement 1, wherein the impedance comprises an inductive element 16a having an inductance L. The protection circuit 24 is arranged to connect to the luminaire via one or more rectifiers 31a.

It is known that an inductance has a small impedance for a DC current. Where a higher impedance is needed for the protection circuit, the use of an inductance on the DC current path behind the one or more rectifiers 31a may seem counter-intuitive.

However, it was recognized by the inventors that it is more advantageous to arrange the inductance behind the rectifiers. This lies in a recognition that practical rectifiers do not generate an ideal DC current. This 'flaw' of rectifiers is recognized by the inventors as a key to a more advantageous embodiment.

The one or more rectifiers 31a are arranged to generate an output with a ripple that can be considered as a DC part and an AC part, wherein the AC part has a frequency higher than the output frequency of the ballast, typically twice as much as the ballast output frequency.

On the one hand, when the switch 15 is open, the inductance provides very little impedance for the DC part of the rectified current, but can provide a much higher impedance to the AC part of the rectified current. As the impedance of an inductance is proportional to the frequency, an inductance L in FIG. 4 of a given size can provide twice as much as impedance compared to the situation that the impedance is arranged in the AC current path in front of the one or more rectifiers 31a.

It was recognized by the inventors, that for many conventional rectifiers, the overall effect (taking into account the DC part and AC part) of arranging the impedance 16 behind the rectifiers 31a, 31b (DC-chain) results in a better performance than arranging the impedance 16 in front of the one or more rectifiers 31a (AC-chain). For some simple rectifiers (e.g. a full-wave rectifier using four diodes), the DC part is relatively small. In this case an inductance 2L in an AC chain can be replaced by half of the inductance L in the DC-chain.

Even if the rectifier outputs some DC part, it is observed that arranging the inductor in the DC-chain still can still effectively reduce the current supplied by the constant power ballast.

The impedance provided by the inductive element 16a reduces the AC part of the current when switch 15 is open. Since the relationship between current flowing through the LEDs and the forward voltage of the LEDs is non-linear (typically exponential), the DC part of the current is not independent of the reduction in AC part of the rectified current. Instead, these two parts are affected together by the impedance. As a result, the inductive element 16a reduces the total current drawn from the ballast to an extent more than just the AC part of the rectified current.

Thus, arranging the impedance 16 behind the one or more rectifiers 31a (DC-chain) results in an advantage that a smaller inductance can be used for the impedance 16 compared to the situation that the impedance is arranged in front of the one or more rectifiers 31a (AC-chain). This allows use of a smaller and cheaper inductor and thus reduces the cost and makes it easier to fit the inductor into the LED lamp arrangement.

The inductive element 16a may be an inductor as shown in FIG. 4, but may also be a transformer.

It is also recognized by the inventors, that arranging the impedance 16 behind the one or more rectifiers 31a particularly provides an advantage when the inductance L of the inductive element is within a particular range of 120 μH-300 μH At a given frequency, a higher inductance can provide a higher impedance. However, an inductance will also oppose to a decrease in the current. When the AC part of the rectified current decreases, the inductance generates an inductive voltage opposing to the decrease in the current. Thus, a higher inductance has a greater tendency to maintain the current at a steady value. This causes a conflict with the objective of reducing the current using an impedance. In other words, there is a conflict between a higher impedance value and a higher inductance value.

This conflict is reconciled by the inventors, as arranging the inductive element 16a behind the one or more rectifiers 31a can provide an increased effect. This results in a sufficient impedance value with a lower inductance value. This leads the inventors to observe a suitable range of inductance of 120 μH-300 μH. In this range, a lower current drawn from the ballast and a lower temperature of the ballast are observed, and even a lower power consumed by the LED lamp arrangement 1 is observed.

Figure 5:
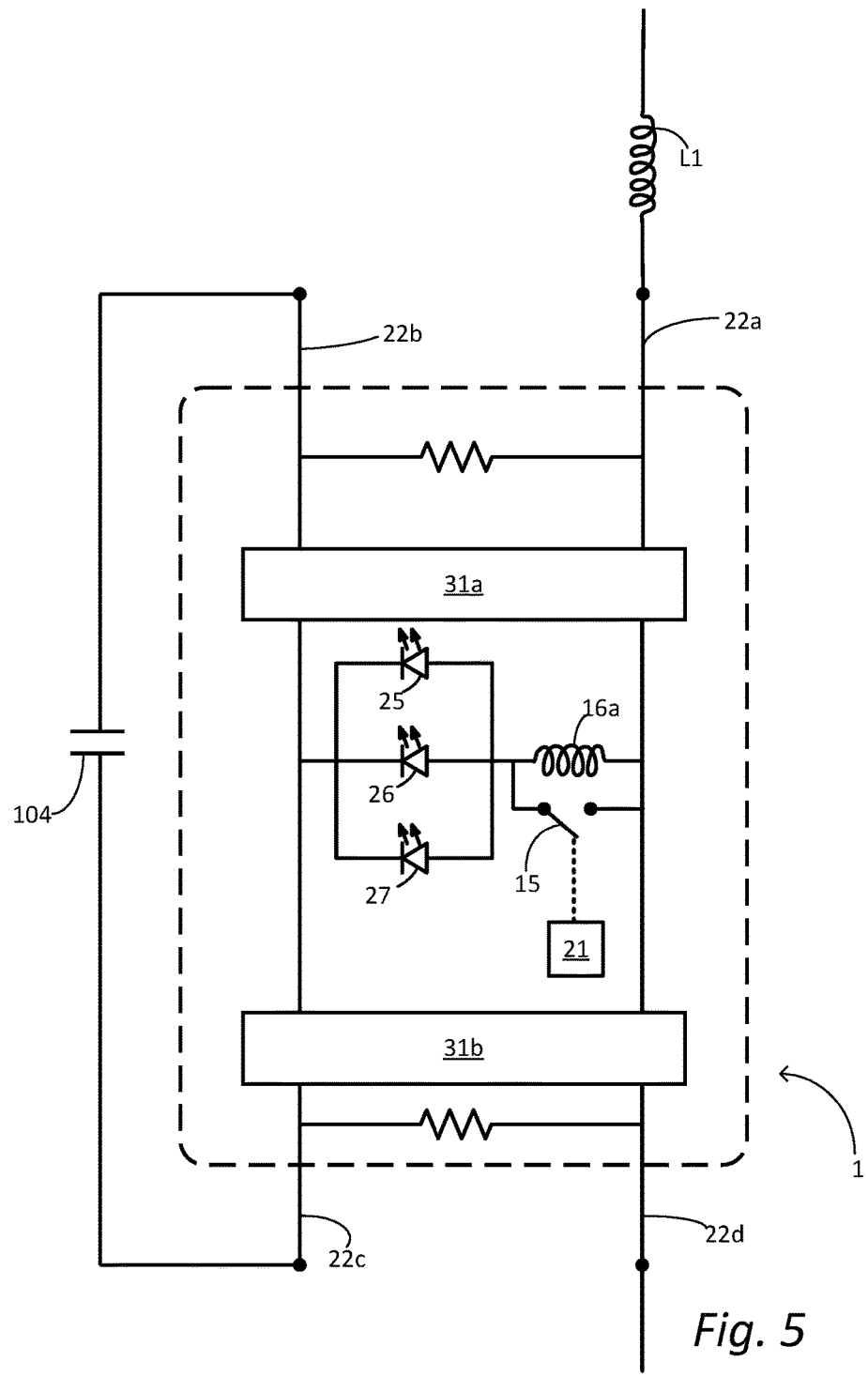
FIG. 5 shows an embodiment of the LED lamp arrangement 1 of the invention, comprising four electrodes for connecting to the luminaire and a protection circuit similar to FIG. 4.

FIG. 5 shows an embodiment similar to the embodiment of FIG. 4. In this embodiment, the LED lamp arrangement 1 comprises four or more electrodes 22a-22d for connecting to the luminaire.

Figure 1:
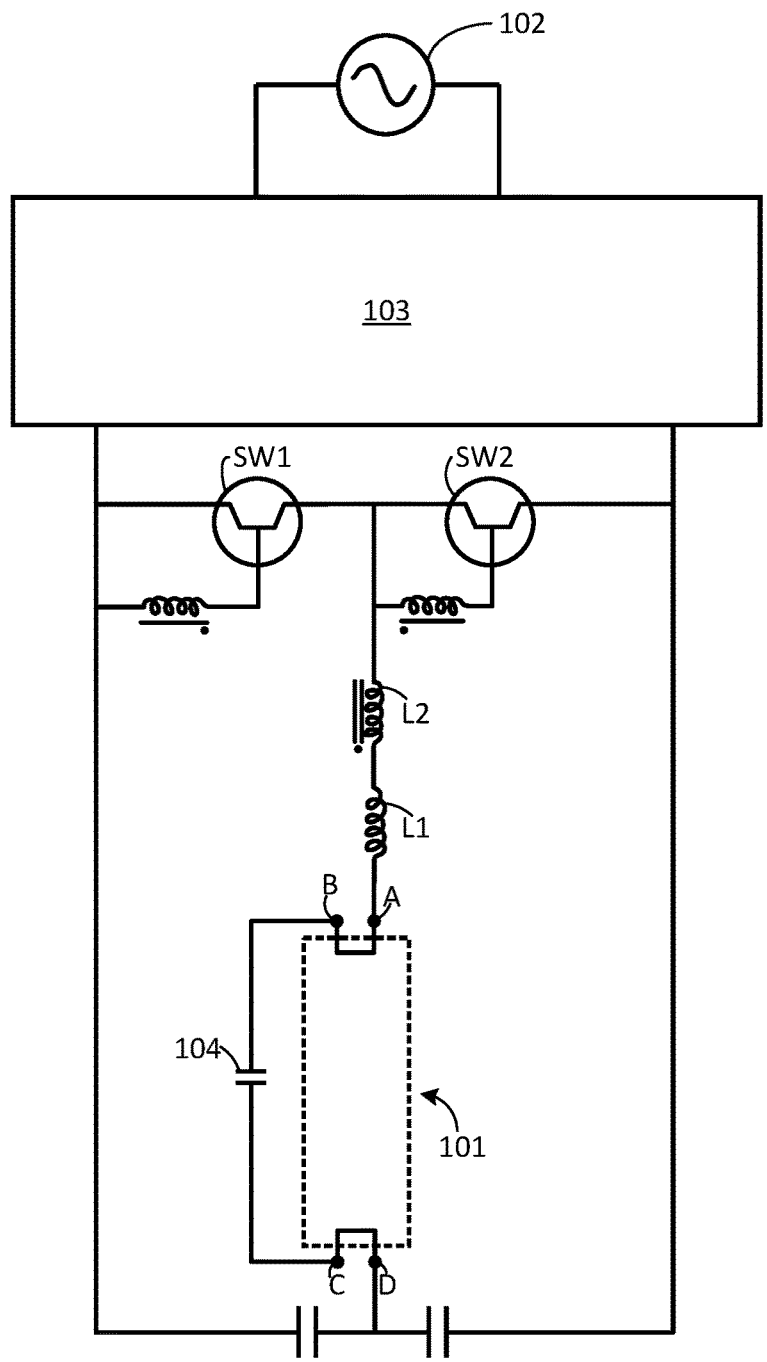
FIG. 1 shows a fluorescent lamp 101 arranged in a luminaire having a constant power ballast.

This embodiment may be used to replace a fluorescent lamp 101 as shown in FIG. 1, which has four electrodes for connecting to the luminaire. It is desired that the consumer can connect the LED lamp arrangement 1 to such luminaire just like a fluorescent lamp, i.e. the consumer is not required to know which electrode 22 should be connected to which electrode in the luminaire. As described in FIG. 1, the luminaire makes a distinction between hot ends A, D and cold ends B, C.

In this embodiment, arranging the protection circuit 24 behind the two or more rectifiers 31a, 31b provides an additional advantage that the effect of the protection circuit 24 does not make any difference regardless of how the LED lamp arrangement is inserted into the luminaire, i.e. regardless of how the electrodes 22a-22d are connected.

The hot ends form a circuit with the AC main source and supplies a higher current. For the purpose of the invention, the protection circuit 24 should be connected to the hot end. If the protection circuit 24 is arranged in front of the rectifier 31a, 31b, one needs to make sure that the protection circuit is connected to the hot end. Since the consumer usually does not know which is the hot end and which is the cold end, there need to be at least two of the protection circuit 24, for example at a first electrode 22a and a second electrode 22b.

Thus, in this embodiment, arranging the protection circuit 24 in the DC-chain allows use of one protection circuit 24 having an inductance L, compared to two protection circuits each having two times of the inductance 2L. The cost of the latter is roughly four times as much as the former.

Similar to the embodiment of FIG. 4, in the embodiment of FIG. 5 there is also a particularly advantageous range of inductance of the inductive element 16a of the impedance 16, i.e. 120 μH-300 μH.

The inventors have made calculations of the average power consumed by the LED lamp arrangement 1 ('Power'), the average current drawn from the ballast ('Current'), and an estimated temperature of components inside the ballast ('temperature'). The relevant parameters used were as follows:

Each group of LEDs 25, 26, 27: 14 LEDs arranged in series;
Constant Power Ballast: designed for 54 W. The model used: Philips HFE 158 TL-D.

TABLE 1

| No. | Setting | Power (W) | Current (mA) | Temperature (° C.) |
|---|---|---|---|---|
| 0 | Fluorescent lamp of 58 W | 48.0 | 480 | ≈56 |
| 1 | No protection circuit | 47.1 | 904 | >110 |
| 2 | One inductor (470 μH) at electrode 22b | 47.3 | 883 | >95 |
| 3 | One inductor (470 μH) at electrode 22a | 46.7 | 793 | ≈85 |
| 4 | One inductor (470 μH) at electrode 22d | 46.1 | 793 | ≈82 |
| 5 | One inductor (470 μH) at electrode 22c | 47.5 | 877 | >95 |
| 6 | One inductor (220 μH) arranged as FIG. 5 | 37.9 | 745 | ≈65 |

As shown in Table 1 above, the results 2 and 5 indicate that the protection circuit is connected to a wrong side (cold end). As a result, the current and the temperature are both comparable to 1, in which no protection circuit is used.

Results 3 and 4 indicate that the protection circuit is correctly connected to the hot end, i.e. connected to L1 shown in FIG. 5. As a result, the current and the temperature are lower than those in 1, 2 and 5. Nevertheless, the power consumption in 3 and 4 are the same as the power consumption in 1, 2 and 5.

Result 6 shows that a smaller inductance in the DC-chain achieves a lower power consumption, lower current, and lower temperature comparing to embodiments in 2-5.

Without being bound by theory, the inventors consider that the better performance (especially the lower power consumption) is a consequence of a period during which the AC part of the rectified current decreases to zero. This period exists because the inductance is small enough not to maintain the current above zero during the entire valley period of the AC part of the rectified voltage. During this period, the AC part of the rectified current does not consume any power. This is similar to so-called Discontinuous Conducting Mode (DCM) in the field of switching power supplies. As a result, the average power consumed by the LED lamp arrangement 1 is lower, the average current drawn from the ballast is lower, and the temperature of the elements of the ballast is lower.

Figure 6:
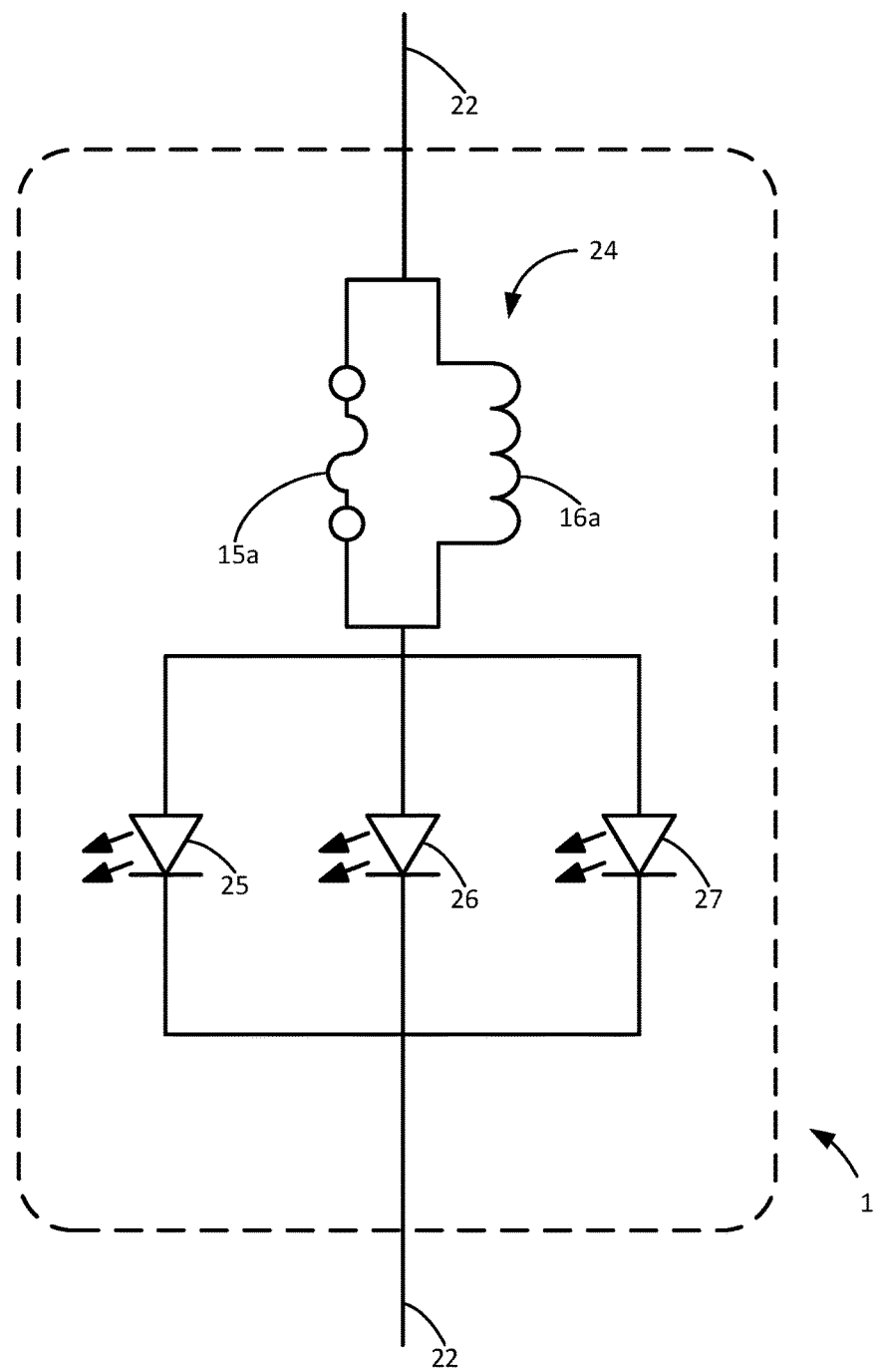
FIG. 6 shows an embodiment of the LED lamp arrangement 1 of the invention, comprising a fuse for switching from a lower impedance mode to a higher impedance mode.

FIG. 6 shows an embodiment of the LED lamp arrangement 1 of the present invention, which may comprise one or more elements described under FIGS. 1-5 In the embodiment shown, the sensor circuit 21 comprising fuse 15a is integrated with the protection circuit 24.

In this embodiment, the protection circuit 24 is arranged to automatically switch from the first operation mode to the second operation mode, once a current flowing though the fuse 15a reaches a threshold value. The fuse 15a functions as a sensor in the sensor circuit for (passively) measuring a current representing the total current drawn from the ballast, as well as a switch having a threshold value for changing the impedance of the protection circuit.

The fuse 15a may be arranged across an inductor 24a, as shown in FIG. 6. In the first operation mode, the fuse 15a is conducting; in the second operation mode, the fuse 15a is blown, such that all current flowing through the protection circuit 24 flows through the inductor 24a.

The ballast supplies an alternating (AC) current to the LED lamp arrangement. The frequency of the ballast output is typically in the range of 20-50 kHz for an electronic ballast. An LED lamp arrangement typically includes a full-wave rectifier to generate a DC current to drive the LEDs, resulting in a DC current with an AC part oscillating at twice the ballast output frequency. The fuse 15a is selected to present a low impedance and the inductor 24a a high impedance under these operating conditions.

When the fuse 15a is conducting in a first operation mode of the protection circuit 24, the inductor 24a is effectively shorted by the fuse 15a. As such, the current flowing through the fuse 15a is representative of the total current drawn from the ballast. Preferably, the fuse 15a has a resistance less than 1 Ohm, and the inductor 24 has an inductance larger than 0.1 mH. This results in the protection circuit 24 having a low effective impedance. The DC part of the current divides between fuse 15a and inductor 24a (since the inductor presents a low impedance to DC current) and the AC part of the current flows mostly through the fuse 15a (since the inductor presents a high impedance to AC current). In this operation mode, the protection circuit 24 has little effect on the operation of the LED lamp and the ballast.

As current supplied by the ballast to the LED lamp arrangement increases, the current flowing through the fuse 15a also increases. Once this current reaches a predetermined threshold value, e.g. the rated current of the fuse 15a, the fuse 15a blows and ceases to conduct current (e.g. in less than 2 seconds). This results in the protection circuit 24 switching to a second operation mode having a much higher effective impedance. The current now all flows through the inductor 24a, which presents a high impedance to the AC part of the current.

This second operation mode of the protection circuit 24 is designed for operating with a constant power ballast. The constant power ballast first drives its output current higher, attempting to maintain output power at the designed level. This high current blows the fuse 15a, and the protection circuit 24 presents a high impedance. This increases the voltage at the output of the ballast. The constant power ballast senses that the multiplication of the voltage and current is increased, and reacts by lowering its output current to approach the power it is designed to maintain. As a result, the failure of the ballast is avoided, and also the consumer is not aware of this phenomenon.

In a preferred embodiment, each of the fuse 15a and the inductor 24a are arranged in series with the group of one or more LEDs 25, 26, 27, as shown in FIG. 6.

In one embodiment, the protection circuit is arranged to reduce the current extracted from the ballast to a value below the threshold value, once the protection circuit 24 switches from the first operation mode to the second operation mode.

In one embodiment, after the fuse 15a is blown, the impedance of the protection circuit 24 is determined by the inductive element 16a. The inductance of the inductive element 16a is such that the impedance in the second operation mode is more than a multiple of 100 of the impedance in the first operation mode for an AC part of the current having a frequency larger than 5 kHz.

In one embodiment, the fuse 15a has a resistance between 0.1 Ohm and 0.5 Ohm, and the inductance of the inductor 24a is chosen between 0.1 mH and 0.5 mH. At an operating frequency of electronic ballasts (e.g. 20 kHz), the impedance of the inductor 24a is much higher than the impedance of the fuse. As such, the effective impedance (e.g. a load impedance as viewed by the ballast) in the second operation mode is much higher than the effective impedance in the first operation mode. As the effective impedance has significantly increased after the switching, even though the supply voltage is increased by the ballast, the current is reduced.

Using a fuse 15a has advantages of low cost, wide availability, simplicity, compact size, and reliable operation. Although a typical fuse 15a is only for one-time use, it is not usually a problem since the ballast in the luminaire will usually not change. Once the LED lamp arrangement 1 has replaced a fluorescent lamp in the luminaire and configures to a particular operation mode, it can remain in that mode for that luminaire.

In one embodiment, the threshold value (e.g. the fuse rating/blow-off value of the fuse) is pre-determined and is above 250 mA. This value is above typical values of current supplied by constant current ballasts. This ensures that the impedance as seen by the constant current ballast is low and results in lower power output of e.g. 25 W.

In one embodiment, the threshold value (e.g. the blow-off value of the fuse 15a) is pre-determined corresponding to an AC part of the current extracted from the ballast. In the first operation (low impedance) mode, a DC part of the current flows through the inductive element 16a, and an AC part of the current flows through the fuse 15a. This ensures that constant current ballasts see a load that is largely resistive in nature (e.g. a frequency independent resistance of the fuse 15a), which allows them to operate in normal condition without causing any compatibility issues.

Figure 7:
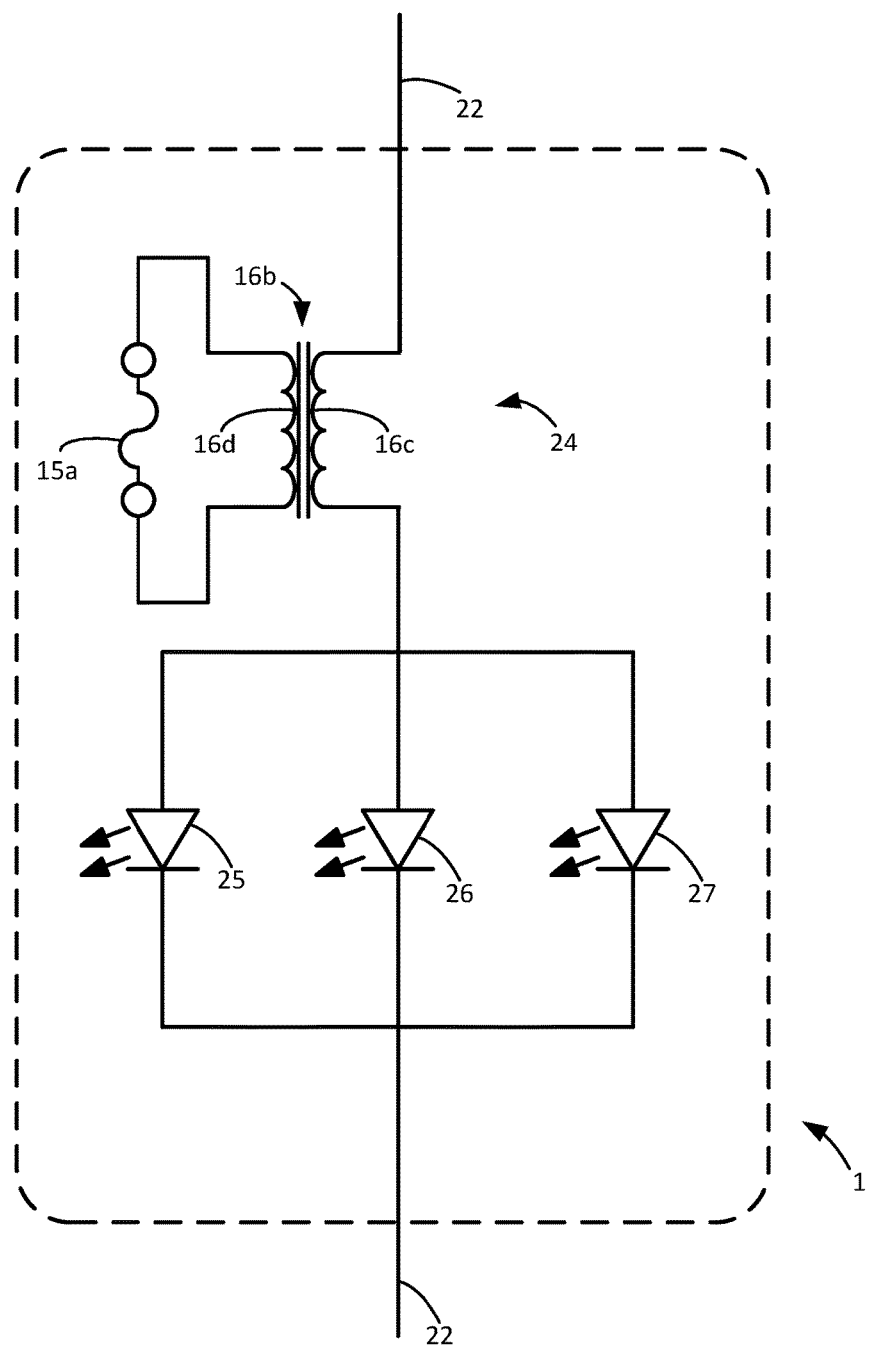
FIG. 7 shows another embodiment of the LED lamp arrangement 1 of the invention, comprising a fuse and a transformer.

FIG. 7 shows an embodiment of the LED lamp arrangement 1 of the present invention, which may comprise one or more of the elements described under FIGS. 1-6. The protection circuit 24 comprises a fuse 15a and a transformer 16b, comprising a first winding 16c and a second winding 16d, wherein the first winding 16c is arranged in series with the group of one or more LEDs, and the second winding 16d is arranged across the fuse 15a.

In one embodiment, the first winding 16c is adapted to an inductance corresponding to a pre-determined impedance at 20 kHz, and the second winding 16d is adapted to a blow-off value of the fuse 15a. This design provides the flexibility to choose a fuse within a wide range of fuse ratings, and adjust the transformer windings to achieve the desired current threshold.

The first and second windings may be the primary and secondary windings of the transformer 16b, respectively or vice versa.

When the current flowing through the fuse 15a is below the threshold value (e.g. in case of constant current ballasts), the fuse is not blown and the AC current flows through the fuse 15a. As the second winding 16d of transformer 16b is shorted by the fuse 15a, the first winding 16c also acts like a short (although there is a current flowing through the second winding 16d determined by the turn ratio of the first and second windings), and the protection circuit 24 exhibits a low impedance added to the group of one or more LEDs 25, 26, 27.

Once the current flowing through the fuse 115a reaches the threshold value (e.g. in case of constant power ballasts), the fuse 15a is blown by the AC current flowing through it. As the second winding 16d of transformer 16b is open-circuited by the fuse, the first winding 16c now acts like a inductor similar to FIG. 6.

The first and second windings of the transformer lob may be adapted so that the current flowing in the second winding 16d and through the fuse 15a is higher than the current flowing through the first winding 16c. This has a multiplier effect, multiplying the current to be measured by the sensor circuit (i.e. the fuse 15a) and thus increasing the sensitivity of the sensor circuit and allowing better discrimination between safe current operating level and excessive current level requiring switching of the protection circuit 24 to its second (higher impedance) operation mode.

Figure 8:
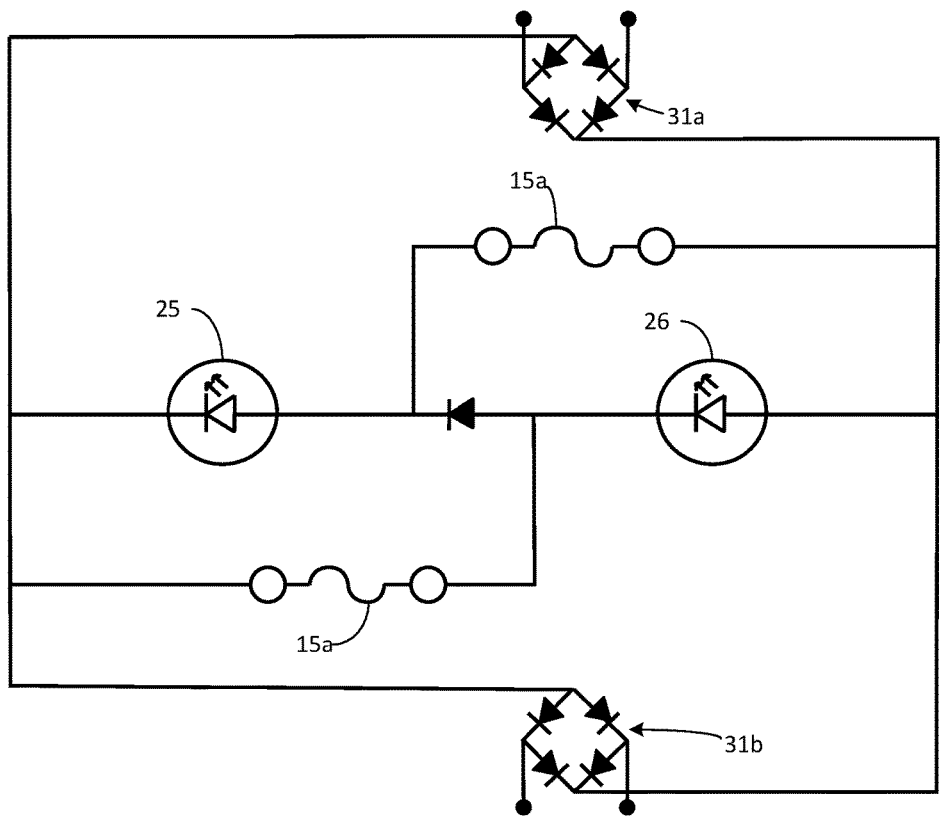
FIG. 8 shows another embodiment of the LED lamp arrangement 1, in which the protection circuit is integrated with the circuit of the LEDs.

FIG. 8 shows another embodiment, in which the protection circuit 24 is integrated with the circuit of the groups of LEDs.

The embodiment of FIG. 8 may comprise two or more groups of LEDs 25, 26, and two or more fuses 15a, which functions as a sensor of the sensor circuit 21 as well as a switch 15 of the protection circuit 24. In this embodiment, the impedance of the protection circuit corresponds to the load impedance of the LED lamp arrangement 1.

When the (rectified) current does not exceed a threshold, the two or more groups of LEDs 25, 26 are connected in parallel. This defines the first operation mode, in which the impedance of the protection circuit corresponds to the impedance of one group of LEDs 25.

When the (rectified) exceeds the threshold, one of the fuses 15a is blown, so all the current now flows through the other fuse. This causes the other fuse 15a also to be blown after a short period. As both fuses 15a are blown, the two or more groups of LEDs 25, 26 are then connected in series. This defines the second operation mode, in which the impedance of the protection circuit corresponds to the load impedance of two or more groups of LEDs.

In this way, the change of impedance of the protection circuit 2.4 can be done by changing the circuit configuration of LEDs, wherein the LEDs are interconnected differently in different circuit configurations.

Figure 9A:
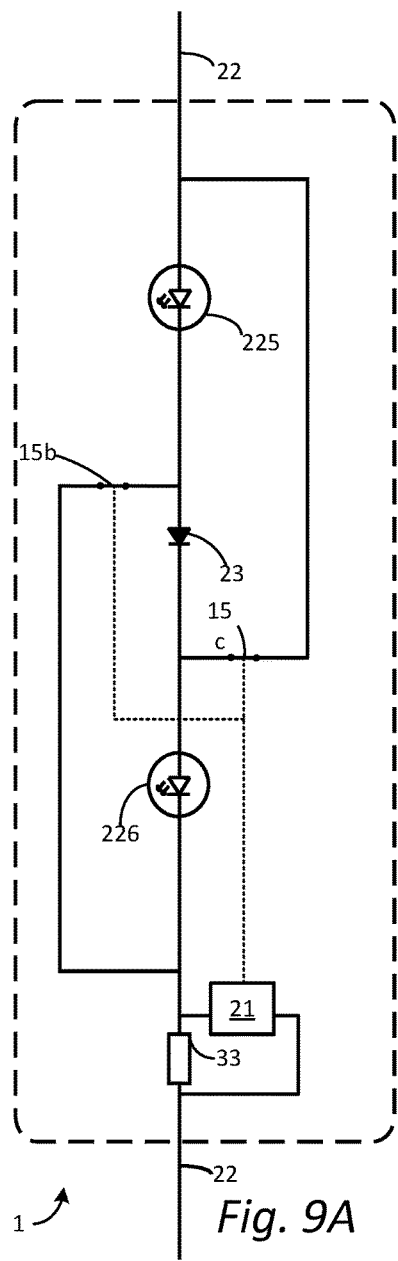
FIGS. 9A and 9B show another embodiment of the LED lamp arrangement 1 of the invention, in which the circuit configuration of LEDs is changeable.
Figure 9B:
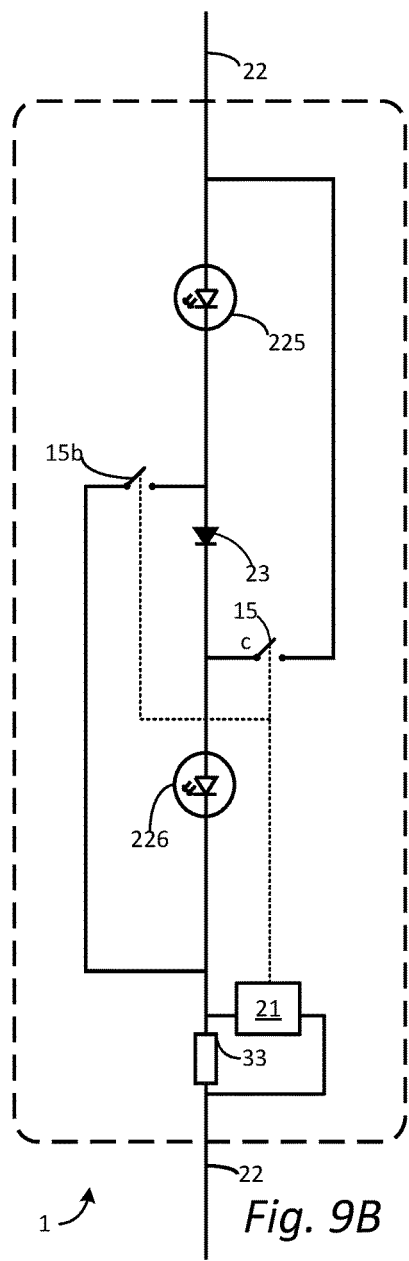

FIGS. 9A and 9B show another embodiment of the LED lamp arrangement 1, in which a group of LEDs 225 and group of LEDs 226 are connectable in different circuit configurations, in dependence of the parameter measured by the sensor circuit 21.

In the embodiment shown, the LED lamp arrangement 1 has a set of switches 15b and 15c. The switches 15b and 15c may be controlled by the sensor 21 in the same way as described above under FIG. 3, for example using transistor switches. The sensor circuit 21 may determine the total current drawn from the ballast, for example by measuring a voltage across a resistor 33. Alternatively, the sensor circuit 21 may be adapted to measure a current flowing through one or more groups of the LEDs 225-226. Either way, on the basis of the measurement, the sensor circuit 21 is arranged to open and close the set of switches 15b, 15c to change the circuit configuration of the groups of LEDs 225, 226.

In this way, the total forward voltage of LEDs across the lamp can be changed by changing the circuit configuration of LEDs. The LED lamp arrangement 21 can be adapted to increase the total voltage across the LED lamp arrangement when the measurement by the sensor circuit 21 indicates that the lamp is connected to a constant power ballast. As this type of ballast maintains a substantially constant power, i.e. $P=I \times V$, for a given power, increasing the total voltage across the lamp will decrease the total current drawn from the ballast. Consequently, the total current drawn from the constant power ballast can be controlled, and damage to components in the ballast can be avoided.

In the embodiment shown, the groups of LEDs 225, 226 are connectable in a first circuit configuration and a second circuit configuration, wherein the two circuit configurations have different interconnections between the groups of LEDs. The first circuit configuration is shown in FIG. 9A, in which the groups of LEDs 225, 226 are connected in parallel. The second circuit configuration is shown in FIG. 9B, in which the groups of LEDs 225, 226 are connected in series. The sensor circuit 21 may be arranged to close the switches 15b, 15c when the total current drawn from the ballast does not exceed a threshold, and to open the switches 15b, 15c when the total current drawn from the ballast exceeds a threshold, wherein the threshold indicates whether the ballast is a constant current ballast or a constant power ballast.

In this way, when the LED lamp arrangement 1 detects that the ballast is a constant power ballast, the circuit configuration of LEDs is changed so that the total forward voltage of the LEDs is increased. As a result, the voltage across the LED lamp arrangement is also increased, and a too high current is therefore avoided, as explained above.

The LED lamp arrangement 1 may comprise more than two groups of LEDs switchable among different circuit configurations. An example is shown in FIG. 10.

Figure 10:
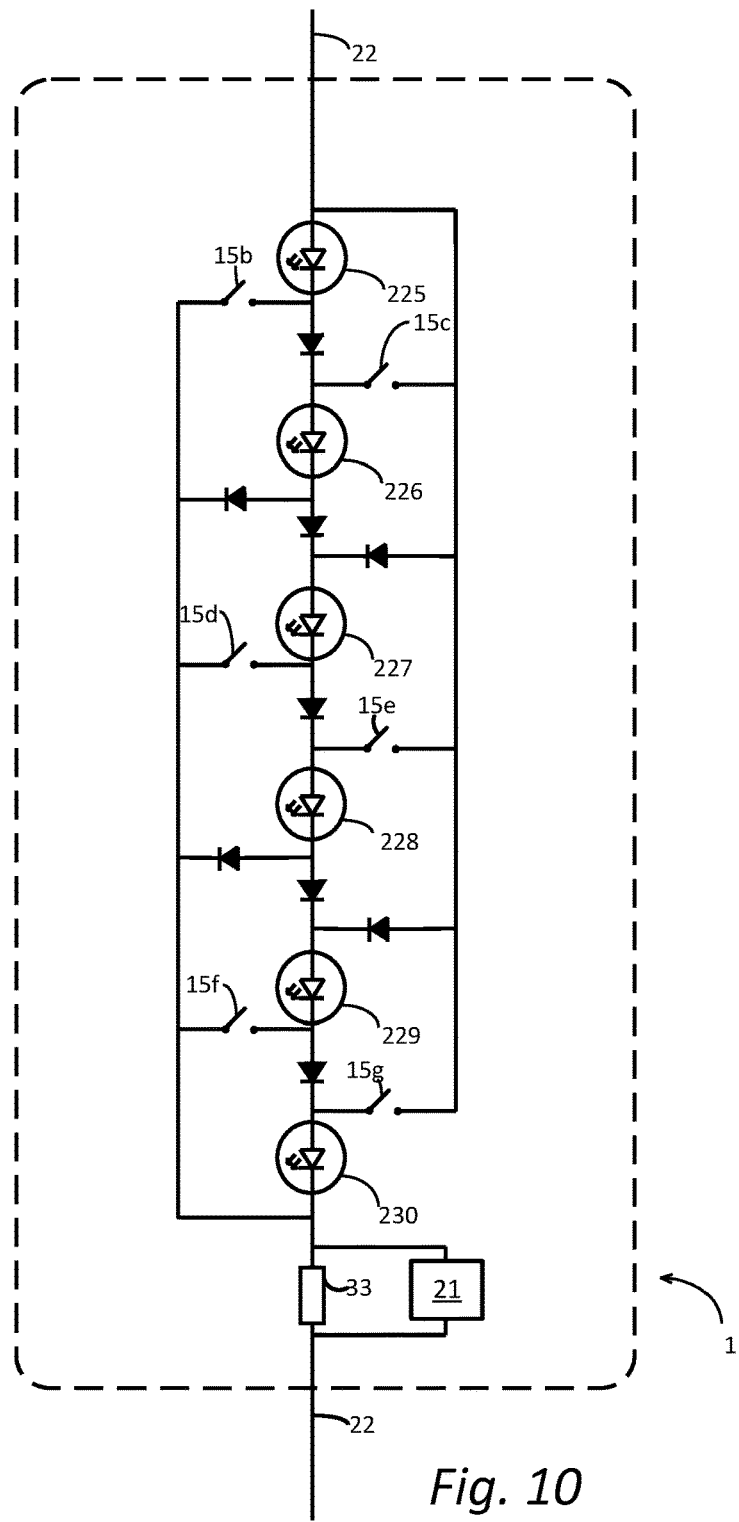
FIG. 10 shows another embodiment of the LED lamp arrangement 1, in which the circuit configuration of LEDs is also changeable.

FIG. 10 shows six groups of LEDs 225-230, and three pairs of switches (15b, 15c), (15d, 15e), (15f, 15g). These switches 15b-15g may be controlled by the sensor circuit 21 in the same way as described in FIGS. 9A and 9B.

Preferably, all the switches 15b-15g are closed when the sensor circuit 21 detects that the total current drawn from the ballast is below a threshold. This mode state is preferably designed for operation under a current drawn from a constant current ballast. In one embodiment, each group of LEDs comprises 10-20 LEDs connected in series.

In one embodiment, when the total current drawn from the ballast exceeds a threshold, the switches 15b-15g are open. In this embodiment, the first circuit configuration corresponds to a parallel connection of six groups 225-230, and the second circuit configuration corresponds to three parallel strings, wherein each string has two groups of LEDs (225, 226), (227, 228), (229, 230) connected in series.

In some embodiments, the LED lamp arrangement 1 is adapted to switch among three or more circuit configurations, in dependence of a plurality of different threshold values which indicate different levels of total current drawn from the ballast. An example is shown in FIGS. 11A-11D.

FIGS. 11A-11D show an embodiment of the LED lamp arrangement 1 similar to FIGS. 9A and 9B, and further has a plurality of sets of switches (15b, 15c), (15d, 15e), (15f, 15g), (15h, 15i), (15j, 15k). Similar to the embodiment of FIGS. 9A, 9B, and 6, these switches 15b-15k are controlled by an output of sensor circuit 21.

Depending on different threshold values of the total current drawn from the ballast, and optionally other parameters such as the frequency of an output of the luminaire, the LED lamp arrangement 1 may be adapted to switch among four different circuit configurations, as shown in the Table below:

TABLE 2

| Switches 15b, 15c | Switches 15d, 15e | Switches 15f, 15g | Switches 15h, 15i | Switches 15j, 15k | Circuit configuration |
|---|---|---|---|---|---|
| Closed | Closed | Closed | Closed | Closed | 6 parallel strings |

TABLE 2-continued

| Switches 15b, 15c | Switches 15d, 15e | Switches 15f, 15g | Switches 15h, 15i | Switches 15j, 15k | Circuit configuration |
|---|---|---|---|---|---|
| Open | Closed | Open | Closed | Open | 3 parallel strings |
| Open | Open | Closed | Open | Open | 2 parallel strings |
| Open | Open | Open | Open | Open | 1 string in series |

As shown in Table 2 above, the LED lamp arrangement 1 in this embodiment can be configured to four different circuit configurations of the groups of LEDs. These different circuit configurations will be explained below in more detail.

Figure 11A:
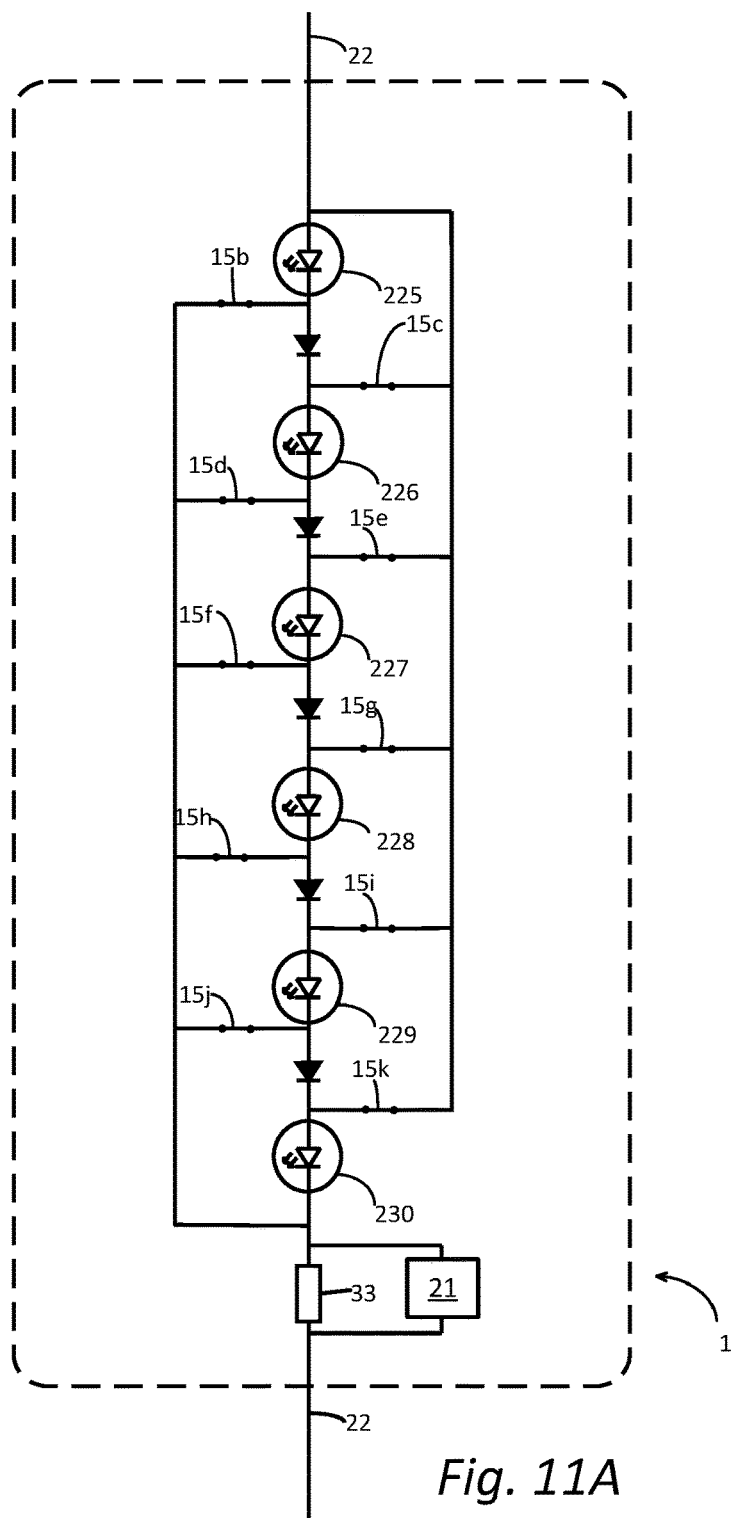
FIGS. 11A-11D show another embodiment similar to FIGS. 9A, 9B and 10, wherein the LED lamp arrangement 1 can switch among more than two circuit configurations.

FIG. 11A shows a first circuit configuration, wherein each group of LEDs 225-230 is connected in parallel to one another. In the first configuration shown, all switches 15b-15k are closed, so that any connections across two or more groups of LEDs are shorted.

Preferably, the first circuit configuration shown in FIG. 11A is configured when the ballast is a constant current ballast, e.g. when the current measured by the sensor circuit 21 is below a first threshold. Since the constant current ballast is substantially a constant current source, it is preferred that the total current drawn from the ballast can be shared by multiple parallel strings of LEDs. In this way, the LED lamp arrangement can operate at a low power when the ballast is a constant current ballast.

Figure 11B:
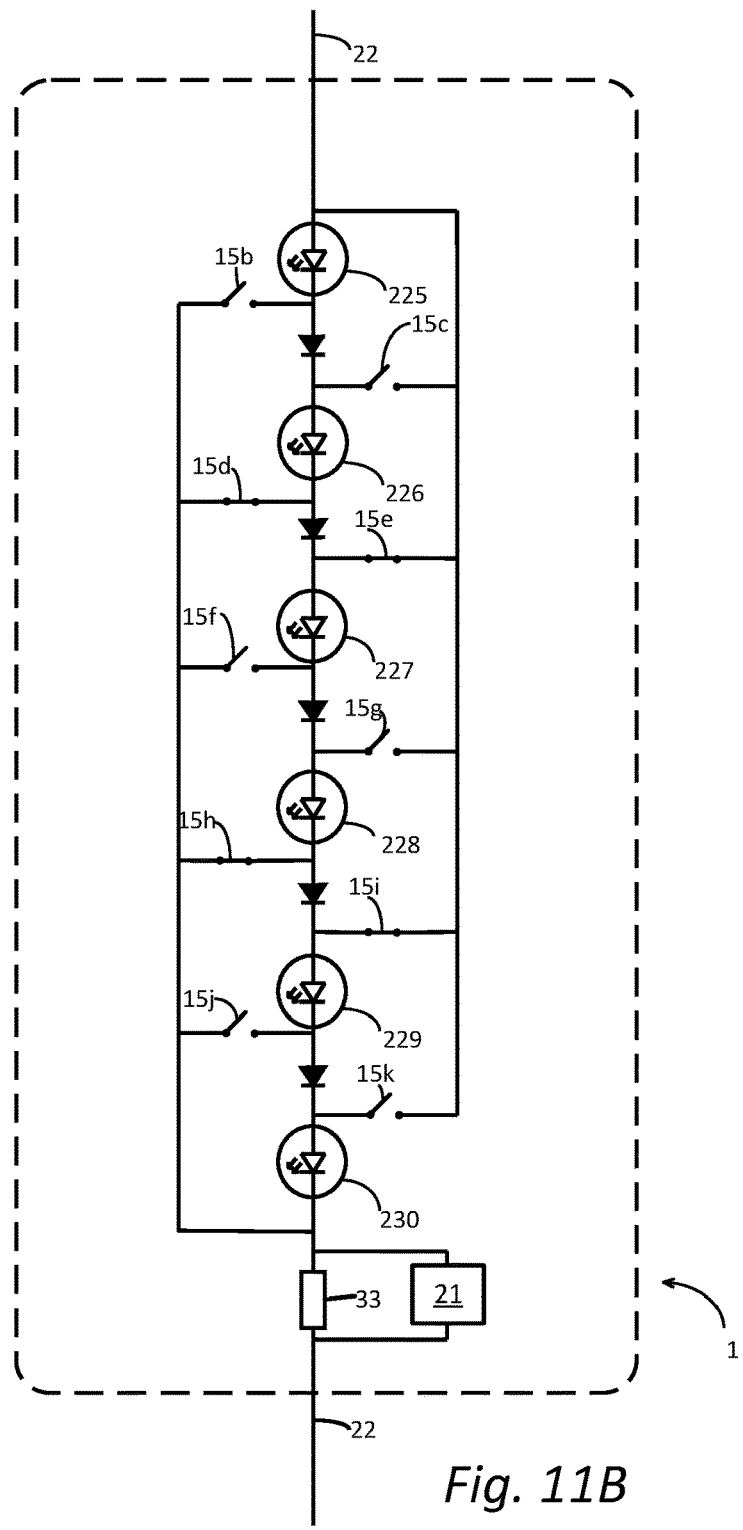

FIG. 11B shows a second circuit configuration, wherein each set of two groups of LEDs are connected in series in a string. This forms three parallel strings of LEDs. In the embodiment shown, a first set of two groups of LEDs 225, 226 are connected in series, a second set of two groups of LEDs 227, 228 are connected in series, and a third set of two groups of LEDs 229, 230 are connected series. The three sets of LED groups form three parallel connections. This circuit configuration may be configured when the ballast is a constant power ballast or when the ballast is a constant current ballast which outputs a constant current which exceeds a first threshold.

The LED lamp arrangement (e.g. the protection circuit therein) may be adapted to selectively control different switches 15b-15k differently. In the embodiment shown, a first set of switches 15b, 15c are open, a second set of switches 15d, 15e are closed, a third set of switches 15f, 15g are open, a fourth set of switches 15h, 15i are closed, and a fifth set of switches 15j, 15k are open. This can be done by, for example, arranging that the switches 15b-15k respond to the output of the sensor circuit 21 differently. Additionally or alternatively, the sensor circuit 21 may generate different outputs for different switches 15b-15k.

In this way, the LED lamp arrangement 1 can be adapted to multiple different circuit configurations to fit multiple different situations. As will be described below, the switches 15b-15k can configure the LED lamp arrangement to some further different circuit configurations.

Figure 11C:
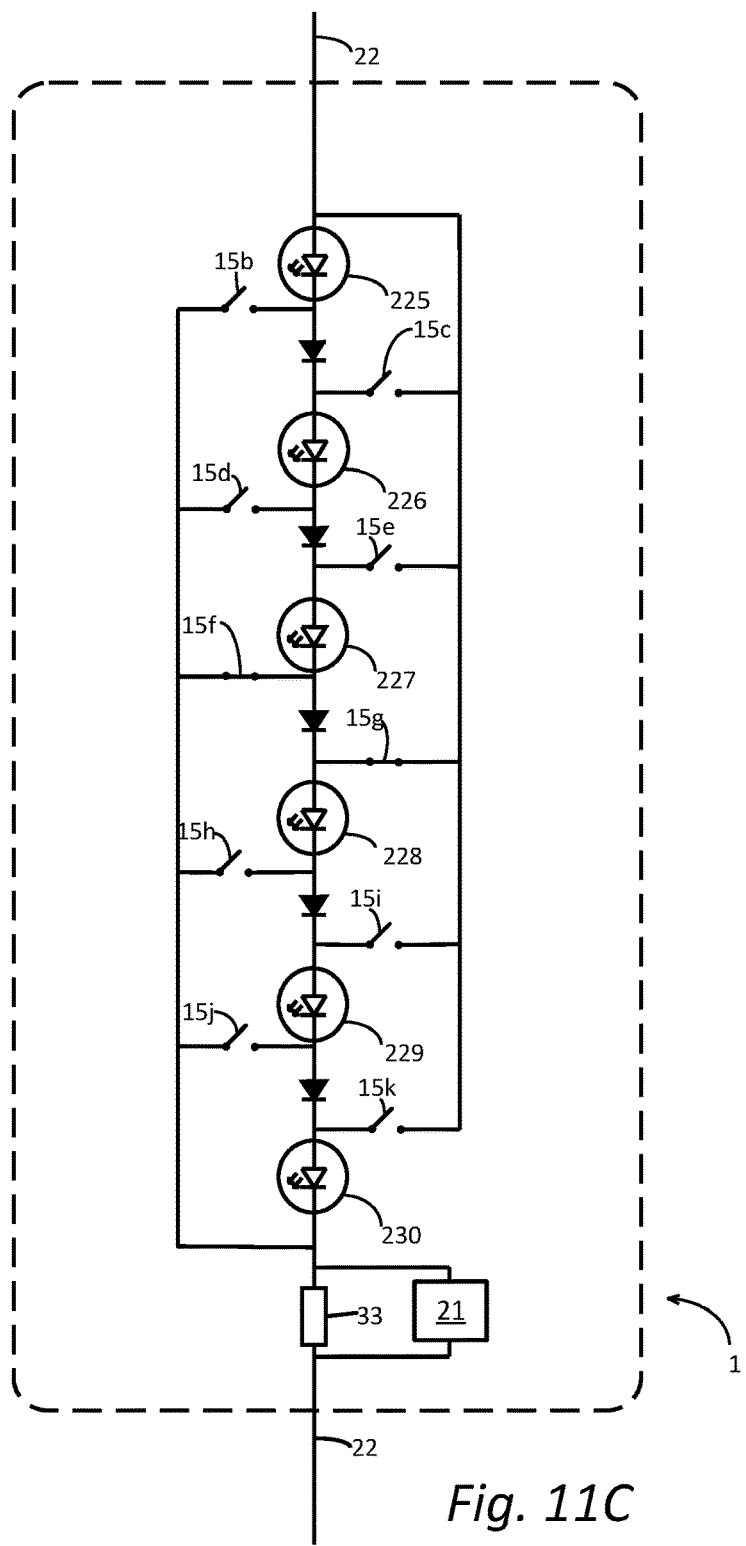

FIG. 11C shows a third circuit configuration, wherein each set of three groups of LEDs are connected in series in a string. This forms two parallel strings of LEDs. In the embodiment shown, a first set of three groups of LEDs 225, 226, 227 are connected in series, and a second set of three groups of LEDs 228, 229, 230 are connected in series. The two strings of LED groups form two parallel connections.

In the embodiment shown, a first set of switches 15b, 15c are open, a second set of switches 15d, 15e are open, a third set of switches 15f, 15g are closed, a fourth set of switches 15*h*, 15*i* are open, and a fifth set of switches 15*j*, 15*k* are open. In this circuit configuration, the connections across for or more groups of LEDs are shorted by the closed third set of switches. This circuit configuration may be configured when the ballast is a constant power ballast or when the ballast is a constant current ballast which outputs a constant current which exceeds a second threshold.

Figure 11D:
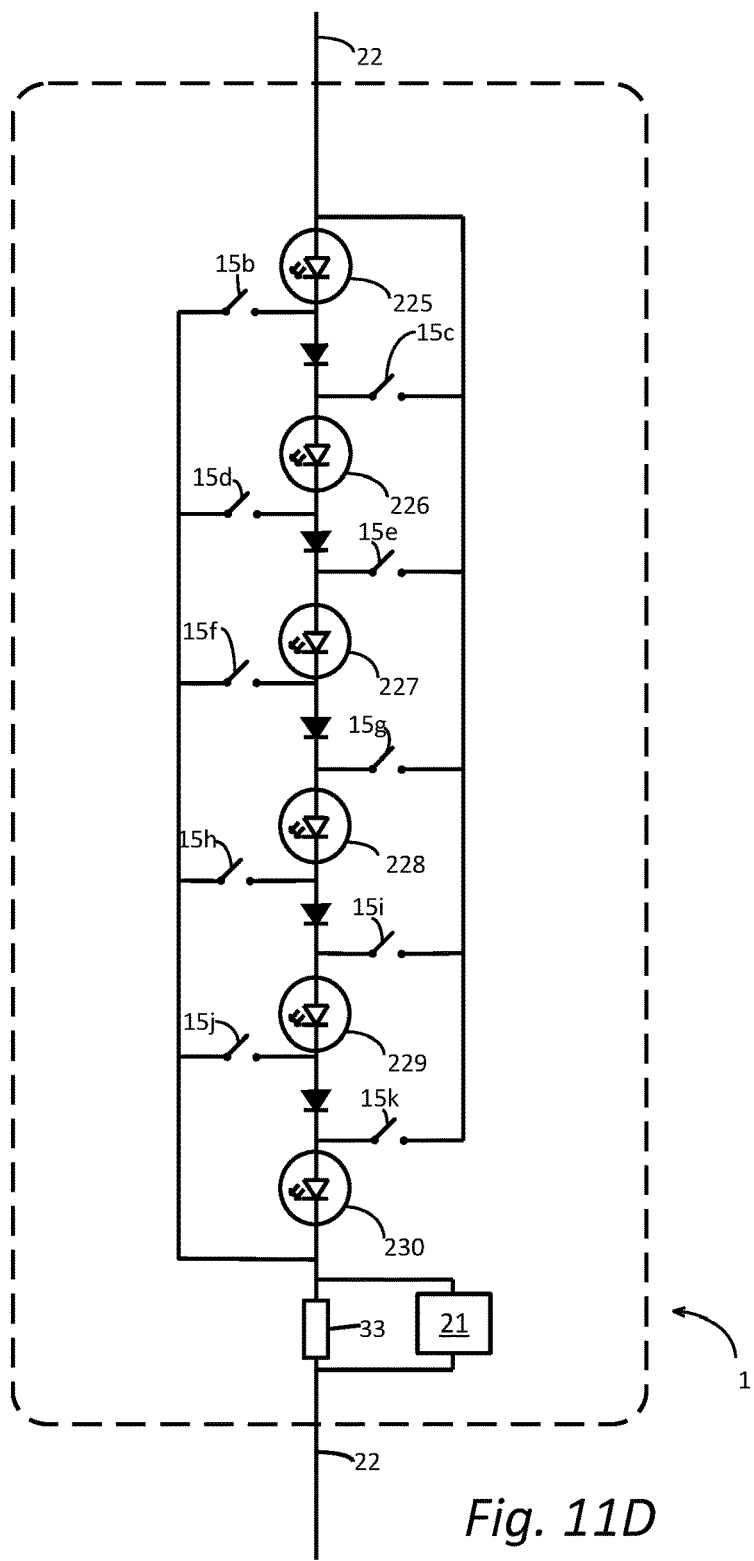

FIG. 11D shows a fourth circuit configuration, in which all six groups of LEDs 225-230 are arranged in series. In the embodiment shown, all switches 15*b*-15*k* are open to achieve this.

The fourth circuit configuration in the embodiment of FIG. 11D may be configured when the ballast is a constant current ballast. Alternatively, this circuit configuration may be configured when the ballast is another type of ballast, which is called 'magnetic ballast'. This type of ballast will be explained below in more detail with respect to other embodiments.

As described above under FIGS. 11A-11D, the LED lamp arrangement 1 may use a plurality of switches 15*b*-15*k* to achieve three or more different circuit configurations of the groups of LEDs 225-230. In this way, multiple operation modes can be configured in dependence of multiple different situations. In some embodiments, the plurality of switches are further adapted to change the circuit configuration of LEDs within one or more of the groups of LEDs. This may be done by for example providing one or more switches inside a group of LEDs. In this way, a change of circuit configuration at the level of each LED can be achieved, so a greater variety of operation modes can be achieved to fit in more different situations.

Figure 12:
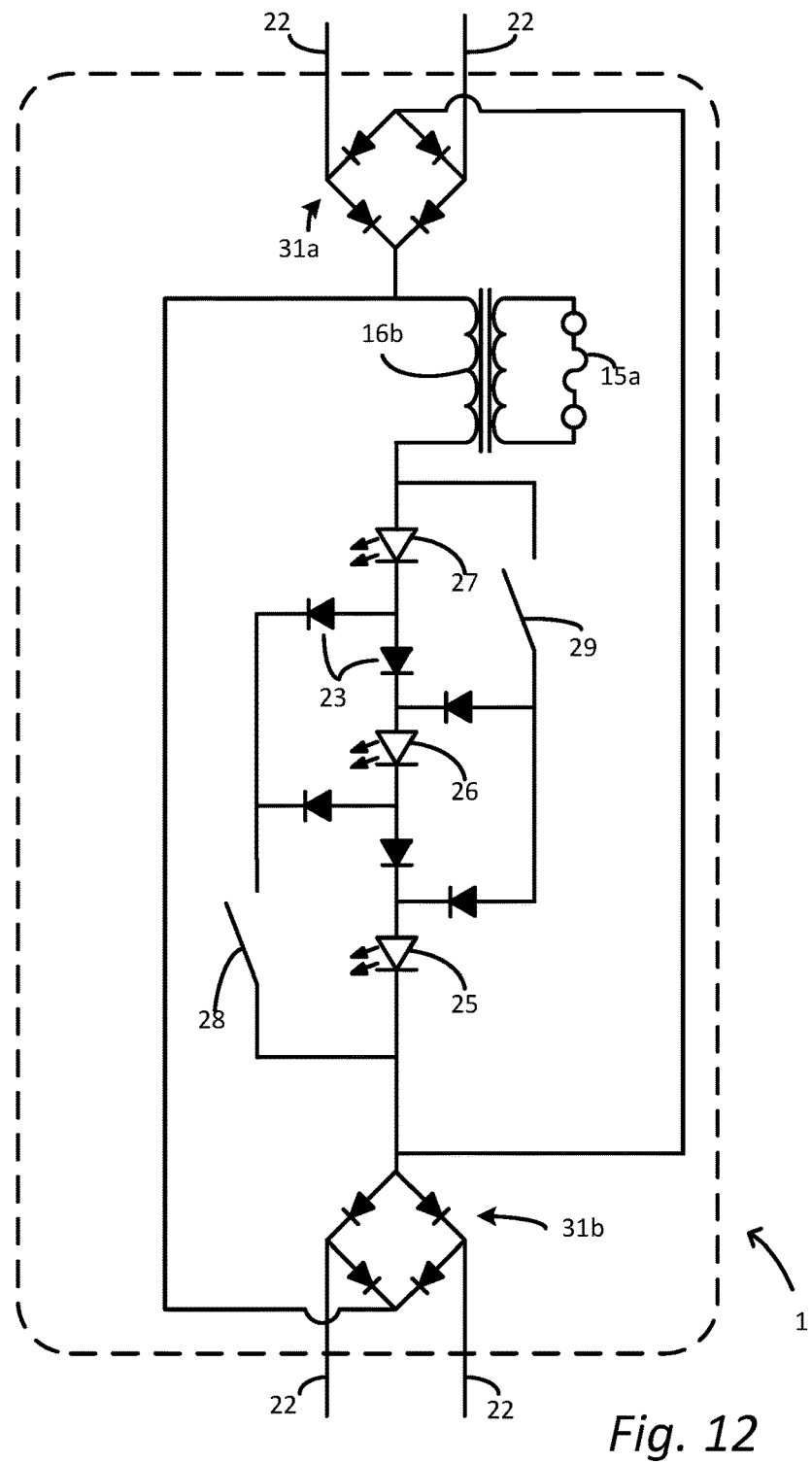
FIG. 12 shows an embodiment of the LED lamp arrangement 1, comprising a group of LEDs which circuit configuration is changeable corresponding to a ballast in the luminaire.

FIG. 12 shows an embodiment of the LED lamp arrangement 1 adapted to replace a fluorescent lamp in a luminaire having an electronic ballast or a magnetic ballast. This embodiment may comprise one or more elements described under FIGS. 1.-11. The fuse 15*a* and transformer 24*b* shown in FIG. 5 function in a similar way to FIG. 4, and may be replaced by one or more other elements described under FIGS. 1-11.

The embodiment comprises the inductive element as described under FIGS. 4-7, a group of three or more strings LEDs, wherein the strings of LEDs are arranged to switch between a parallel circuit configuration and a series circuit configuration.

The strings of LEDs string comprise a first LED string 25, a second LED string 26, and a third LED string 27. Each string comprises one or more LEDs connected in series in a substring, and optionally a plurality of LEDs connected in series in a second substring which is connected in parallel with the first substring.

In an embodiment, as shown in FIG. 12, the LED lamp arrangement 1 further comprises a first configuration switch 28 and a second configuration switch 29. The first configuration switch 28 is arranged across the first LED string 25 and the second LED string 26, and the second configuration switch 29 is arranged across the second LED string 26 and the third LED string 27.

The group of LEDs may be arranged to switch among two or more circuit configurations. In the embodiment shown, a first circuit configuration is where the first and second configuration switches 28, 29 are both closed, such that the first, second and third LED strings 25-2.7 are arranged in parallel; a second circuit configuration is where the first and second configuration switches 28, 29 are both open, such that the first, second, and third LED strings 25-27 are arranged in series.

Figure 15:
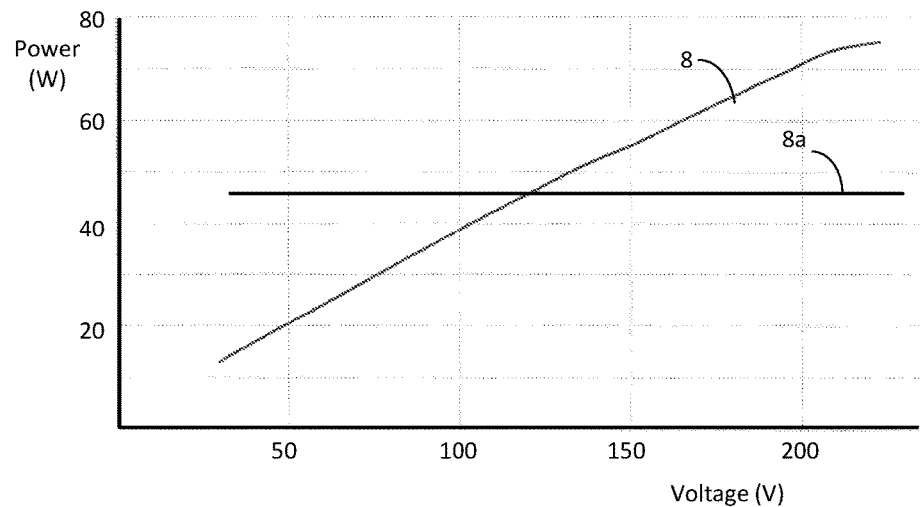
FIG. 15 shows a characteristic P-V curve of a constant current electronic ballast and a constant power electronic ballast.
Figure 16:
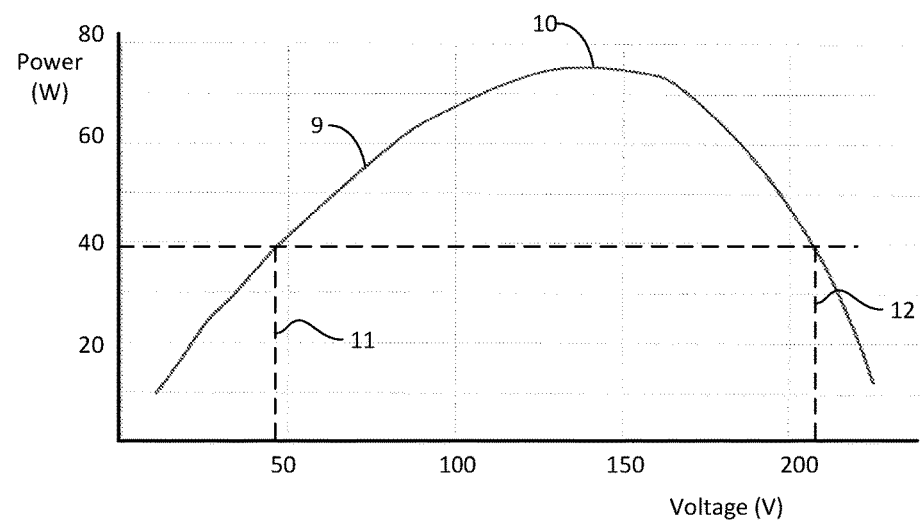
FIG. 16 shows a characteristic P-V curve of a magnetic ballast.

In the embodiment shown, the second circuit configuration is suitable for replacing a fluorescent lamp in a luminaire having a magnetic ballast, and the first circuit configuration is suitable for replacing a fluorescent lamp in a luminaire having an electronic ballast. Referring to FIGS. 15 and 16, which show an example of characteristic curves for electronic ballasts and magnetic ballasts. The horizontal axis represents forward voltages of the group of LEDs 25-27, and the vertical axis represents the power supplied by the ballast.

In FIG. 15, curve 8 represents a characteristic curve of a constant current ballast, with an approximately linear correlation between the power supplied by the ballast as and the forward voltage of LEDs. This demonstrates its applicability as a (constant) current source. Curve 8*a* represents a characteristic curve of a constant power ballast, wherein the power supplied by the ballast is substantially a constant.

FIG. 16 represents a characteristic curve for a typical magnetic ballast, where the power supplied by the ballast increases with output voltage to a maximum at point 10 and then decreases as the forward voltage of the LED string further increases. When the magnetic ballast is used to power the LED string, an increase in the total forward voltage of the LED string relative to the situation at maximum point 10 will result in shifting the operating point to the right of maximum point 10 resulting in a decrease of power.

As can be seen in FIG. 16, the characteristic curve exhibits the same power output at two different voltages when operating at below the maximum 10. For example, a power output of 40 watts is achieved at operating voltages of approximately 50V and 210V, indicated at dashed lines 11 and 12 in FIG. 16. At these two voltages, the luminaire will operate at two different current levels and two different power factors, with substantially the same output power. At the higher voltage operating point, though, the reactive power is decreased (similar to a case of a voltage source), and resistive losses in the coil and the connecting wiring, and the magnetization and saturation losses of the ballast core are therefore also decreased, so that the luminaire, at the above-mentioned output power, has a lower input power and as a result it operates more efficiently.

Therefore, the LED lamp arrangement 1 is preferably configured to a higher total forward voltage, where the ballast is a magnetic ballast. Where the ballast is an electronic ballast, the LED lamp arrangement is preferably arranged to further switch between two configurations. The LED lamp arrangement 1 is preferably configured to a lower total forward voltage and a lower impedance, where the ballast is a constant current ballast, and configured to a higher impedance where the ballast is a constant power ballast.

Referring back to FIG. 12, the first and second configuration switches 28, 29 can be controlled to adjust the circuit configuration in dependence on the type of ballast used in the luminaire. This may be accomplished by providing a control circuit which detects the presence of a magnetic ballast, or an electronic ballast, or discriminates between the two types of ballast, and controls the configuration switches accordingly. For example, the control circuit may detect a characteristic of the voltage or current output by the ballast, for example by detecting a frequency of the voltage or current.

When the ballast is a magnetic ballast, the current flowing through the LEDs is typically relatively lower than the case of electronic ballasts. Hence, the current is typically lower than the fuse 15*a* and the protection operates in the first operation mode. To provide more certainty, the protection circuit is preferably provided with an inductance between 0.1 mH and 1 mH. When the LED lamp arrangement 1 (e.g. LED tube) is operated with a Magnetic ballast, the low frequency voltage/current (e.g. 100 Hz) supplied by the Magnetic ballast results in a low impedance of the inductance. In that case, the impedance of the protection circuit is low regardless whether the fuse 15*a* is blown. This achieves the objective that the LED lamp arrangement 1 operates at a high forward voltage with a low effective impedance, where the ballast is a magnetic ballast.

Where the ballast is an electronic ballast, the LED strings 25-27 are configured in parallel, and the protection circuit is configured to the first (low impedance) operation mode and the second (high impedance) operation mode, depending on the measured current and/or measured voltage from the ballast as described under FIGS. 2-11.

Thus the LED lamp arrangement 1 according to the present invention makes it possible to provide full compatibility with all types of ballasts.

Below, the operation of the two or more circuit configurations is explained in more detail. In an embodiment, the control circuit opens the first and second configuration switches 28 and 29 when the control circuit receives an input indicating a magnetic ballast is used, and closes both configuration switches 28 and 29 when the control circuit receives an input indicating an electronic ballast is used. This results in changing the circuit configuration of the LED strings so that the three LED strings 25-27 are connected in series when a magnetic ballast is used, and the three LED strings 25-27 are connected in parallel when an electronic ballast is used. In this way, the forward voltage across the LED string in changed in dependence type of ballast used to drive the LED lamp arrangement.

A control circuit for control of the configuration switches 28, 29 mechanism in a practical arrangement may comprise a detection part that discriminates between magnetic and electronic ballasted systems, and a switch part that effects the actual switching between circuit configurations, for example, between a series and a parallel circuit configuration. Magnetic ballasts operate at mains frequencies, usually 50 or 60 Hz, and electronic ballasts operate at high frequencies, typically between 20 kHz and 50 kHz depending on the type and brand of ballast. This difference in operating frequency can be used to discriminate between the type of ballast.

The first configuration switch and/or the second configuration switch may comprise one or more switches and one or more frequency detection circuits. The switches may be comprise simple transistor switches, Darlington switches and charge pump driven transistors, relays and/or other types of electromechanical switches. The frequency detection circuit(s) distinguish between a magnetic ballast and an electronic ballast and provide an appropriate input to control the switches. A simple implementation of the frequency detection circuits is a filter, such as an inductor, resistor, capacitor circuit, an active filter, or any circuit which can generate an output which discriminates between a high frequency (e.g. from an electronic ballast) and a low frequency (e.g. from a magnetic ballast).

The LED lamp arrangement 1 may comprise one or more (full-wave) rectifiers 31*a*, 31*b*, as shown in the drawing, as an output from a magnetic ballast is typically highly AC, which may cause the LEDs to be reverse-biased at some phases.

In the embodiment shown, the LED lamp arrangement 1 comprises one or more connecting diodes 23. The connecting diodes 23 may be replaced in an alternative embodiment by a suitable controlled switch.

Figure 13:
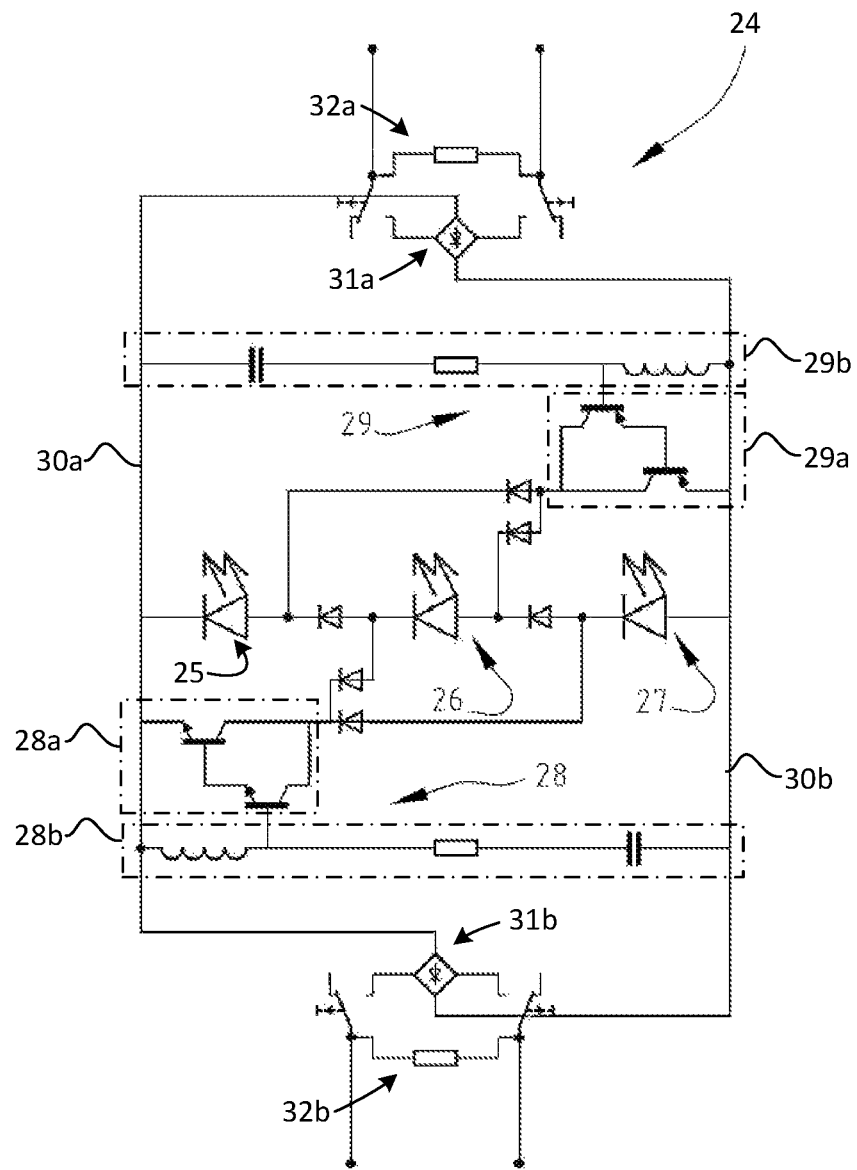
FIG. 13 shows a more detailed representation of the switch among circuit configurations in FIG. 8.

FIG. 13 depicts a more detailed representation of the switch among circuit configurations in FIG. 12. The embodiment shown in FIG. 13 comprises two configuration switches 28 and 29, which each comprise a transistor switch 28*a*, 29*a* and a frequency detection circuit 28*b*, 29*b*. The switches 28*a*, 29*a* can comprise, for example, simple transistor switches, Darlington switches and charge pump driven transistors, relays and/or other types of electronic or electromechanical switches. The frequency detection circuits 28*b*, 29*b* distinguish between a magnetic ballast and an electronic ballast and provide an appropriate input to control the switches 28*a*, 29*a*. A simple implementation of the frequency detection circuits 28*b*, 29*b* is a filter, such as an inductor, resistor, capacitor circuit as shown in FIG. 12, an active filter, or any circuit which can generate an output which discriminates between a high frequency (e.g. from an electronic ballast) and a low frequency (e.g. from a magnetic ballast).

Figure 14:
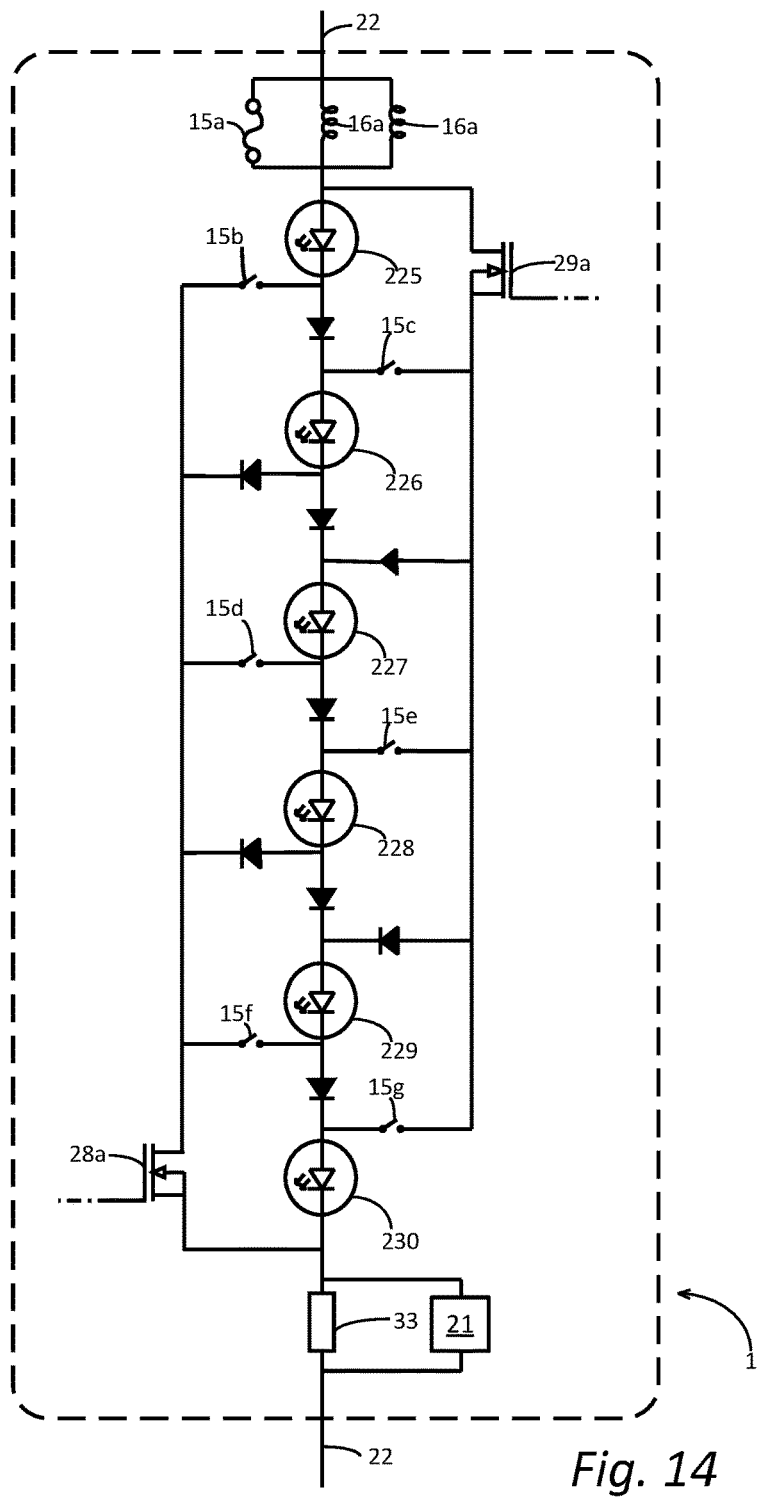
FIG. 14 shows an example that different embodiments in FIGS. 1-9 may be combined with each other.

FIG. 14 shows an embodiment of the LED lamp arrangement 1, which comprises groups of LEDs 225-230 connected in the same or similar way as the groups of LEDs 225-230 and the switches 15*b*-15*g* in FIG. 10, and comprises two transistor switches 28*a*, 29*a*, connected in a similar way to the configuration switches 28, 29 in FIGS. 12 and 13, and the fuse 15*b* and one or more inductive elements 16*a* as described under FIG. 3. This embodiment may include any other elements described above under FIGS. 1-13. For example, the groups of LEDs and the switches may be configured according to FIG. 11 instead.

In the embodiment shown, the sensor circuit 21 controls the switches 15*b*-15*g* in the same way as in FIG. 10, and the transistor switches 28*a*, 29*a* operate in the same way as the configuration switches 28, 29 as described above. This defines three different circuit configurations, as will be explained below in more detail.

In the first circuit configuration, switches 15*b*-15*g* are closed, and transistor switches 28*a*, 28*b* are also closed. This forms a parallel connection of six groups of LEDs 225-230. This circuit configuration corresponds to the first circuit configuration in FIG. 10.

In the second circuit configuration, switches 15*b*-15*g* are open, and transistor switches 28*a*, 28*b* are closed. This forms three parallel strings, wherein each string has two groups of LEDs (225, 226), (227,228), (229, 230) connected in series. This circuit configuration corresponds to the second circuit configuration in FIG. 10.

In the third circuit configuration, transistor switches 28*a*, 28*b* are open. As a result, the six groups of LEDs 225-230 are connected in series. This circuit configuration corresponds to the second circuit configuration of FIG. 12, and also corresponds to the fourth circuit configuration of FIG. 11D.

In this way, by combining the components described in FIGS. 10, 11A-11D and 12, multiple circuit configurations can be achieved.

In the embodiment shown, the groups of LEDs 225-230 are connected to a fuse 15*a* and one or more inductors 16*a* in a similar way to the embodiment of FIG. 6. Alternatively, the transformer 16*b* in FIG. 7 may also be used.

By combining the embodiments of FIGS. 2-7 and 8-12, a two layered protection can be achieved. Using a fuse 15*a* as a part of the protection circuit 24 has an advantage of low-cost, but the fuse rating typically has an error range and has a limit of the preciseness of its response. On the other hand, controlling the switches 15*b*-15*g* may be more precise, but is more complex and may be more expensive. Comparing the embodiment of FIG. 10 to FIGS. 11A-11D, this embodiment only uses half the number of switches 15*b*-15*g*, controls the switches 15*b*-15*g* in a simpler way (all-on/all-off), while still achieving more than three operation modes (i.e. there are three circuit configurations of the groups of LEDs, and a conducting vs. blown-off state of the fuse 15*a*). This embodiment therefore has an advantage of low cost while still having multiple operation modes for fitting multiple situations.

In the embodiment of FIG. 14, the sensor circuit 21 measures the parameter in a similar way as the embodiments of FIGS. 9-11, e.g. measuring a voltage across a resistor 33 to determine the total current drawn from the ballast. Alternatively, the sensor circuit may also determine the current by measuring the voltage across one of the transistor switches 28*a* and 28*b*. When these switches are closed, the transistor switches also have a measurable impedance suitable for determining the current.

Further modifications in addition to those described above may be made to the structures and techniques described herein without departing from the spirit and scope of the invention. Additionally, each embodiment described may comprise one or more components from another embodiment. Accordingly, although specific embodiments have been described, these are examples only and are not limiting upon the scope of the invention, which is determined according to the claims.

The invention claimed is:

1. An LED lamp arrangement adapted for fitting in a luminaire, the luminaire adapted for a fluorescent tube and having a ballast, the LED lamp arrangement comprising:
 a plurality of LEDs;
 two or more electrodes for releasably connecting to the luminaire and for receiving a current from a ballast for supply to the plurality of LEDs) in a first operation mode; and
 a sensor circuit adapted to measure one or more parameters related to an amount of current received from the ballast in the first operation mode;
 wherein the LED lamp arrangement is arranged to operate in a plurality of operation modes, wherein current from the ballast is conducted through the LEDs in each operation mode;
 wherein the LED lamp arrangement is adapted to automatically switch from the first operation mode to a second operation mode if the measured one or more parameters exceed a threshold which indicates whether the ballast is a constant current ballast or not a constant current ballast; and
 wherein, in the first operation mode, the LED lamp arrangement has a lowest load impedance among the plurality of operation modes.

2. The LED lamp arrangement according to claim 1, wherein the LED lamp arrangement comprises a protection circuit electrically connected to at least one of the electrodes and adapted to control an amount of current drawn from the ballast by the LED lamp arrangement by switching from the first operation mode to the second operation mode.

3. The LED lamp arrangement according to claim 2, wherein the protection circuit has a first impedance in the first operation mode, and has a second impedance in the second operation mode which is different from the first impedance.

4. The LED lamp arrangement according to claim 2, wherein the sensor circuit comprises a fuse, and the protection circuit comprises an impedance and the fuse, the impedance being arranged in series with the plurality of LEDs, and the fuse being arranged in parallel with the impedance, and
 wherein the first operation mode corresponds to a first state of the protection circuit in which the impedance is shorted by the fuse, and the second operation mode corresponds to a second state of the protection circuit in which the fuse is blown.

5. The LED lamp arrangement according to claim 4, wherein the LED lamp arrangement further comprises one or more AC to DC rectifier circuits arranged in series between the impedance and the ballast of the luminaire.

6. The LED lamp arrangement according to claim 4, wherein the impedance has a total inductance value between 0.12 mH and 0.3 mH.

7. The LED lamp arrangement according to any one of claim 4, wherein the impedance comprises a transformer having a first winding and a second winding, wherein the first winding is arranged in series with the plurality of LEDs, and the second winding forms a closed loop with the fuse.

8. The LED lamp arrangement according to any one of claim 1, wherein the measured one or more parameters represent an amount of current received from the ballast by the LED lamp arrangement and/or an amount of voltage supplied by the ballast across the LED lamp arrangement.

9. The LED lamp arrangement according to any one of claim 1, wherein the plurality of LEDs are arranged in a plurality of groups;
 wherein the groups of LEDs are connectable in a plurality of circuit configurations including at least a first circuit configuration, and a second circuit configuration having a different circuit arrangement of the groups of LEDs in which at least a portion of the groups of LEDs are connected to each other differently than in the first circuit configuration;
 wherein the first circuit configuration corresponds to the first operation mode, and the second circuit configuration corresponds to the second operation mode; and
 wherein the LED lamp arrangement is adapted to automatically switch a connection of the plurality of groups of LEDs from the first circuit configuration to the second circuit configuration.

10. The LED lamp arrangement according to claim 9, wherein the second circuit configuration comprises a greater number of LEDs connected in a series string than the first circuit configuration.

11. The LED lamp arrangement according to claim 9, wherein the LED lamp arrangement is further arranged to automatically switch from the first operation mode or the second operation mode to a third operation mode, if the measured one or more parameters exceed a second threshold.

12. The LED lamp arrangement according to claim 9 wherein the plurality of circuit configurations further comprise a third circuit configuration, wherein the LED lamp arrangement further comprises a circuit for generating an output indicating whether the ballast is a magnetic ballast or not a magnetic ballast, and a circuit for changing a connection of the plurality of groups of LEDs between the first circuit configuration and the third circuit configuration, or between the second circuit configuration and the third circuit configuration, on the basis of the output.

13. A method for operating an LED lamp arrangement in a plurality of operation modes, the LED lamp arrangement comprising a plurality of LEDs and being fitted in a luminaire, the luminaire being adapted for a fluorescent lamp and having a ballast, the method comprising:

receiving a current from a ballast;
conducting the current from the ballast through a plurality of LEDs in a first operation mode;
measuring one or more parameters related to an amount of current from the ballast in the first operation mode; and
automatically switching from the first operation mode to a second operation mode if the measured one or more parameters exceed a threshold which indicates whether the ballast is a constant current ballast or not a constant current ballast,
wherein, in the first operation mode, the LED lamp arrangement has a lowest load impedance among the plurality of operation modes.

14. The method according to claim 13, wherein switching from the first operation mode to the second operation mode reduces an amount of current drawn from the ballast by the LED lamp arrangement.

15. The method according to claim 13, wherein switching from the first operation mode to a second operation mode comprises increasing an inductance of an impedance through which the current flows.

* * * * *